(12) United States Patent
Ranganath et al.

(10) Patent No.: US 10,453,038 B2
(45) Date of Patent: Oct. 22, 2019

(54) PURCHASE DATA TRANSMISSION AND ANALYSIS SYSTEM

(71) Applicant: JPMorgan Chase Bank, N.A., New York, NY (US)

(72) Inventors: Satyan Ranganath, Landenberg, PA (US); William F. Mann, Avondale, PA (US); Sean H. Murray, West Chester, PA (US); Allison A. Keevil, West Grove, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 132 days.

(21) Appl. No.: 15/725,406

(22) Filed: Oct. 5, 2017

(65) Prior Publication Data

US 2018/0046991 A1  Feb. 15, 2018

Related U.S. Application Data

(63) Continuation of application No. 13/795,147, filed on Mar. 12, 2013, now Pat. No. 9,811,810, which is a (Continued)

(51) Int. Cl.
*G06Q 20/04* (2012.01)
*G06Q 20/40* (2012.01)
(Continued)

(52) U.S. Cl.
CPC ....... *G06Q 20/0453* (2013.01); *G06Q 20/209* (2013.01); *G06Q 20/40* (2013.01);
(Continued)

(58) Field of Classification Search
CPC ........................................ G06Q 40/12
(Continued)

(56) References Cited

U.S. PATENT DOCUMENTS 7,792,709 B1   9/2010  Trandal et al.
9,811,810 B1 *  11/2017  Ranganath ......... G06Q 20/0453
(Continued)

FOREIGN PATENT DOCUMENTS

EP   1662450   5/2006

OTHER PUBLICATIONS

Random House Dictionary, 2012, definition of "matching".

*Primary Examiner* — Russell S Glass
(74) *Attorney, Agent, or Firm* — Greenblum & Berstein, P.L.C.

(57) ABSTRACT

A system may perform steps such as receiving a bank card transaction authorization stream including a URL originating from the merchant computing system, the URL received in a discretionary field in the authorization stream for a bank card purchase. The system further perform the step of retrieving information at a location referenced by the URL, wherein the information includes at least a merchant identifier and line item data related to a purchase. The system may additionally attaching the retrieved data to the transaction to create a complete description of the transaction analyze the complete description of the transaction for creating at least one customer interface for the customer and at least one merchant interface for the merchant based on the analysis.

20 Claims, 21 Drawing Sheets

Related U.S. Application Data continuation-in-part of application No. 13/165,929, filed on Jun. 22, 2011, now abandoned.

(60) Provisional application No. 61/666,053, filed on Jun. 29, 2012.

(51) Int. Cl.
*G07F 9/02* (2006.01)
*G06Q 20/20* (2012.01)
*G06Q 30/02* (2012.01)
*G06Q 40/02* (2012.01)

(52) U.S. Cl.
CPC ....... *G06Q 20/405* (2013.01); *G06Q 30/0201* (2013.01); *G06Q 40/02* (2013.01); *G07F 9/023* (2013.01)

(58) Field of Classification Search
USPC .......................................................... 705/30
See application file for complete search history.

(56) References Cited

U.S. PATENT DOCUMENTS

| | | |
|---|---|---|
| 2005/0289025 A1 | 12/2005 | Fredericks et al. |
| 2008/0154704 A1 | 6/2008 | Flake et al. |
| 2015/0058186 A1* | 2/2015 | Argue .................... G06Q 40/12 705/30 |

* cited by examiner

Capture Item level information from receipts (Level-III)

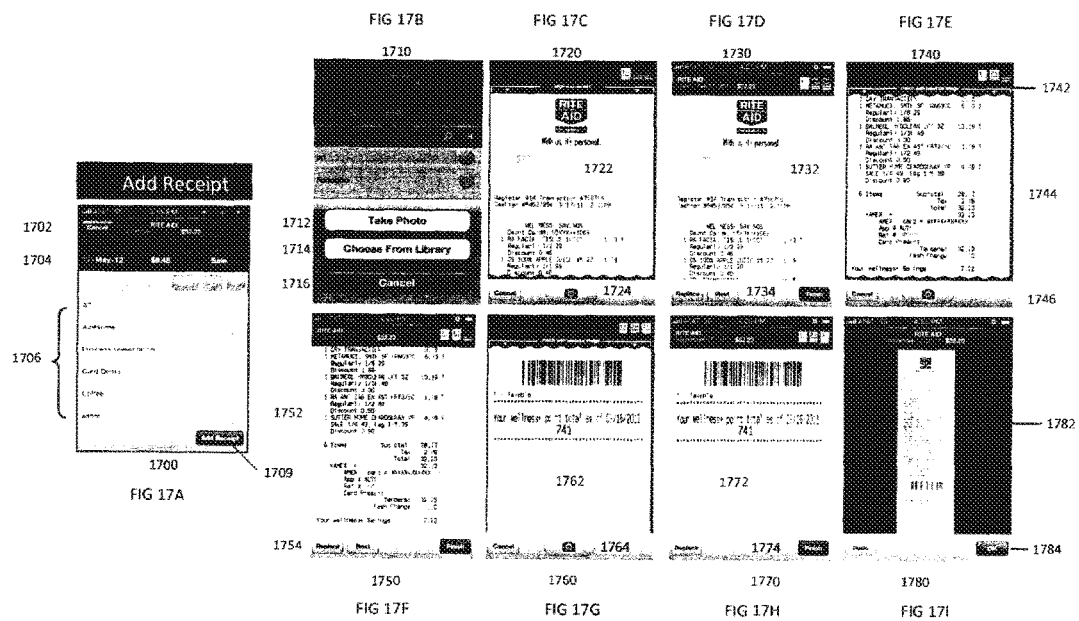

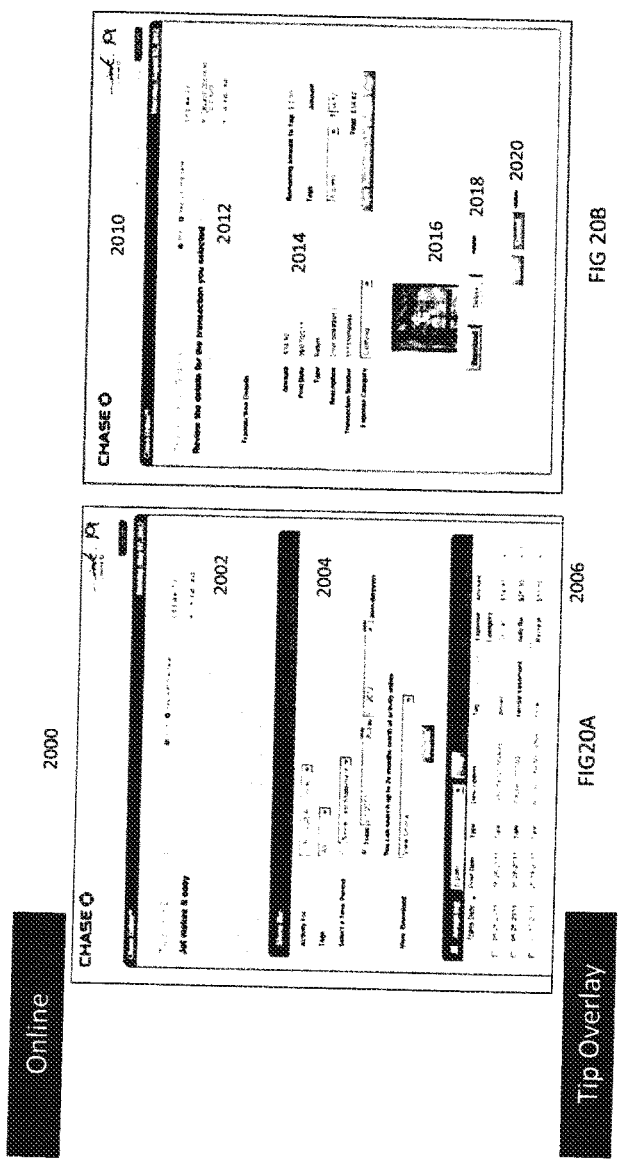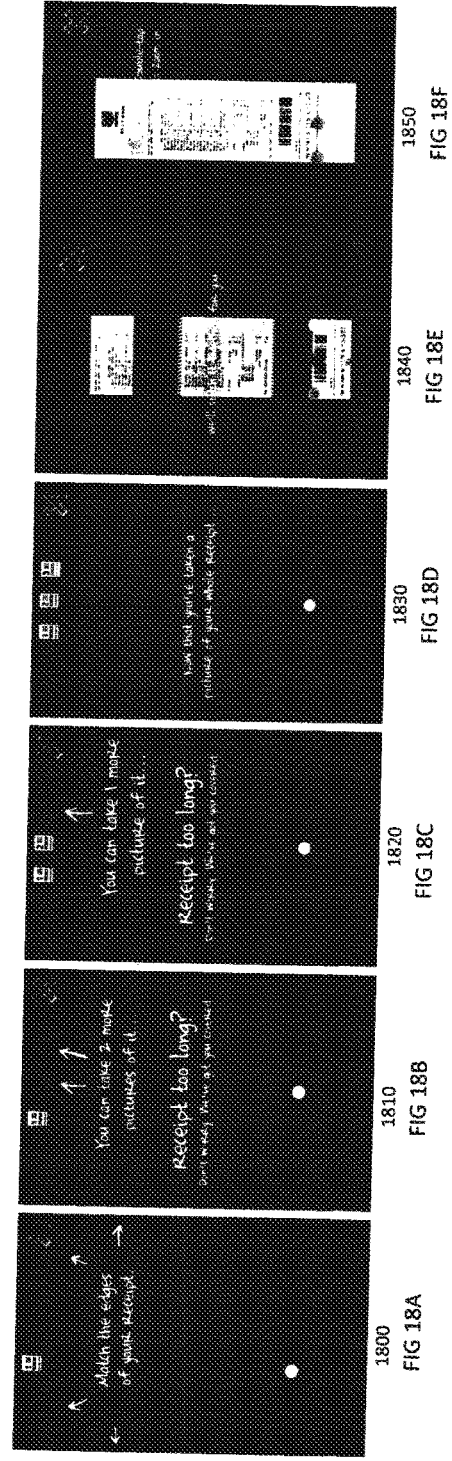

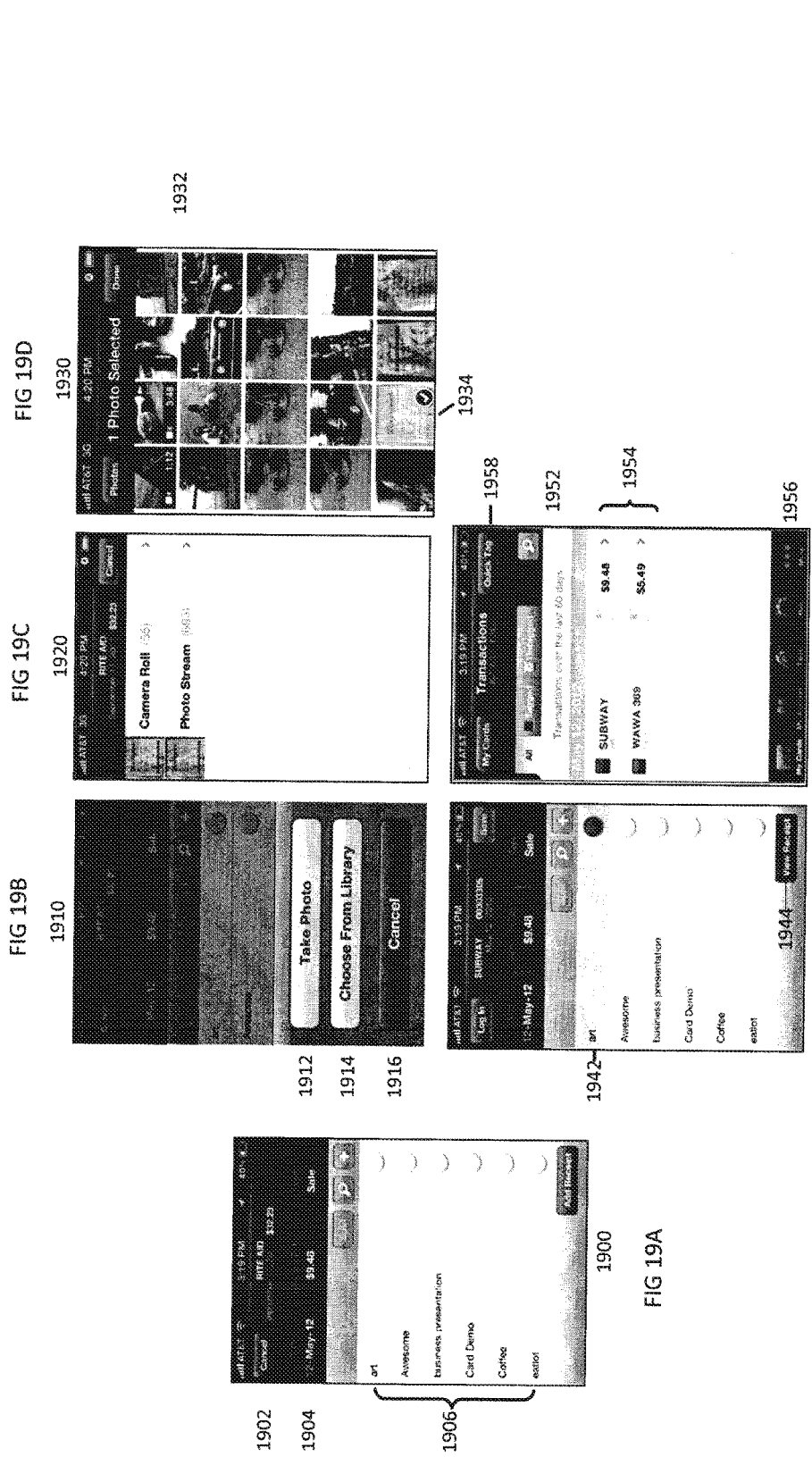

PURCHASE DATA TRANSMISSION AND ANALYSIS SYSTEM

RELATED APPLICATIONS

This application is a continuation application of U.S. patent application Ser. No. 13/795,147 filed on Mar. 12, 2013, which claims priority to provisional application 61/666,053, filed on Jun. 29, 2012. U.S. patent application Ser. No. 13/795,147 is also a Continuation-In-Part of U.S. patent application Ser. No. 13/165,929 filed on Jun. 22, 2011. All of these applications are hereby incorporated in their entirety.

TECHNICAL FIELD

Embodiments of the invention are related generally to systems and methods for facilitating transmission, analysis, and presentation of purchase data, and in particular to providing an optimized technique for both merchants and customers.

BACKGROUND OF THE INVENTION

E-commerce or e-business solutions may allow an individual to perform financial transactions over the Internet through a secure website. This type of service enables customers to do their banking or financial transaction processing from anywhere where Internet access is available. In many cases, a web browser is utilized and any normal Internet connection is suitable.

In recent years, consumers have drastically reduced the use of cash payment for goods and services and have more frequently relied on credit cards, debit cards, stored value cards, or electronic transfer of funds associated with a financial account to facilitate financial transactions. Financial institutions have begun offering businesses a credit card account that offers account holders the option of shifting invoice-based check spending to a business credit card. For example, business credit cards designed for contractors have the objective of inducing them to do away with invoice-based payments by check and shift to more frequent use of their business credit cards.

Customers, including individuals, contractors, and other businesses frequently make purchases or issue disbursements for multiple projects, clients, or customers in a single financial transaction. For example, when a contractor uses an open-loop credit card to make a single purchase of multiple items for a variety of projects, an electronic billing application generally allows the contractor to view only limited data regarding the transaction (e.g., the date, the name of the vendor, and the total dollar amount charged to the credit card) and to electronically settle payment. A solution has developed as disclosed in U.S. Pat. No. 7,949,579, hereby incorporated by reference, that allows a contractor (or other business or individual) to allocate a percentage or dollar amount of the total dollar amount charged to the credit card at a point of sale to a particular project, job, or client matter. As a result, the contractor may need to collect and examine numerous receipts to properly charge clients for items purchased for a particular project.

While U.S. Pat. No. 7,949,579 discloses a system that allows customers to view and allocate data, it does not fully address data capture, storage, transmission, analysis, and display. Credit card networks define III levels of data (Levels I, II, and III) that can be associated with a transaction by a merchant. Level I data is typically provided by merchants for all transactions and includes merchant name, location, transaction amount, merchant category code, and transaction date. Level II data provides additional details such as sales tax amount, and customer account codes. Level III data provides line-item details such as product quantities, product codes, product descriptions, delivery zip codes, freight amount, duty amount, and other applicable data.

Currently, the majority of merchants only provide Level I data to their acquiring banks. The small percentage of merchants that do provide Level II or III data are those with high corporate spending (e.g., hotels, airlines), or fleet card purchases (e.g., gas stations). Transmitting Level III data requires sophisticated merchant point-of sale (POS) system. There is no incentive for merchants to send Level III data unless the merchant has a significant number of large dollar transactions on eligible cards or a large number of eligible transactions.

Merchants having an appropriate mix of eligible transactions and cards processed have already deployed Level III POS systems (traditionally merchants that process travel transactions and commercial/purchasing cards). However, this is a small percentage of merchants.

Currently existing credit card processing systems make it difficult for merchants to transmit Level III data. In the authorization data stream are fields or attributes of data, one of which is bit 63 that contains item level data. Typically, when a customer initiates a card transaction, authorization comes within seconds, but additional data in the stream creates latency. To provide incentive for merchants to supply the data despite the latency, the associations are offering merchants reductions in interchange rates and incentives to give level III data.

However, acquiring banks charge the merchants if the merchants even include one line of data to the association. The charge is currently a per line item fee. The acquiring bank charges negate the fact that the association offers incentives for providing the data.

A recently proposed solution for capturing additional data includes receipt capture from the consumer side. Consumers can use various techniques to capture data on receipts. Consumer capture techniques may involve image capture, for example, with a mobile device. While image capture may be a relatively simple process for standard sized receipts, it can present difficulties with longer receipts. Multiple steps may be required to capture longer receipts and if care is not taken, parts of the receipt may be missing. Furthermore, there is typically little value when the data is provided simply as an image. In order to provide additional value, consumers would have to allow their email or data storage to be mined or filtered in order to provide value.

Accordingly, a solution is needed for collecting receipt data and storing it in association with a particular transaction. The collection of data should minimize expense to both merchants and customers. The solution should extract value from the collected data to create new products, services, behavior analysis, better targeting, better retailer spend analysis. Data including POS data, vendor product information, industry data reviews, and warranties should ideally be integrated in a useful manner with purchase data.

Furthermore, the use of paper receipts has increasingly come into question. Large retailers spend millions of dollars a year, just on paper for creating receipts. The expense and waste associated with paper receipts cannot be overstated. Bottom line costs and environmental impact could be reduced by eliminating paper receipts.

Accordingly, a solution is needed that allows for the transmission and analysis of valuable point of purchase data without the use of paper receipts.

SUMMARY OF THE INVENTION

Embodiments of the invention include a system for facilitating purchase data capture and analysis, the system operating over a network and in conjunction with a user device and a merchant computing system. The system may include at least one computer memory storing instructions and at least one computer processor accessing the at least one computer memory. The computer processor accesses the stored instructions for performing multiple steps. The steps may include receiving a bank card transaction authorization stream including a URL originating from the merchant computing system, the URL received in a discretionary field in the authorization stream for a bank card purchase. The steps may also include retrieving information at a location referenced by the URL, wherein the information includes a merchant identifier and line item data related to a purchase, and attaching the retrieved data to a transaction record to create a complete description of the transaction. The process may further include analyzing the complete description of the transaction for creating at least one customer interface for the customer and at least one merchant interface for the merchant based on the analysis.

In embodiments of the invention, a method is provided for facilitating purchase data capture and analysis. The method operates over a network and in conjunction with a user device and a merchant computing system. The method may include accessing instructions stored in at least one computer memory and executing the stored instructions for performing multiple steps. The steps may include receiving a bank card transaction authorization stream including a URL originating from the merchant computing system, the URL received in a discretionary field in the authorization stream for a bank card purchase, and retrieving information at a location referenced by the URL. The information may include a merchant identifier and line item data related to a purchase. The method may further include attaching the retrieved data to the transaction authorization stream to create a complete description of the transaction and analyzing the complete description of the transaction for creating at least one customer interface for the customer and at least one merchant interface for the merchant based on the analysis.

In further embodiments of the invention, a system for facilitating purchase data capture and analysis is provided. The system operates over a network and in conjunction with a user mobile device and a merchant computing system. The system may include at least one computer memory storing instructions and at least one computer processor accessing the at least one computer memory and executing the stored instructions for performing multiple steps. The steps include receiving transaction information from a merchant and processing an image capture request from a user to capture a receipt, wherein processing the request includes providing a leveling function and a matching function, the leveling function ensuring that the receipt information is fully captured based on an angle between the user mobile device and the receipt and the matching function ensuring that each edge of a captured receipt portion matches an edge of another captured receipt portion. The steps further include matching the captured customer receipt with the transaction information from the merchant and analyzing the transaction for creating at least one customer interface for the customer and at least one merchant interface for the merchant based on the analysis.

Embodiments of the invention include a system for facilitating purchase data capture and analysis, the system operating over a network and in conjunction with a point of sale device at a merchant computing system. The system may include at least one computer memory storing at least one driver and at least one computer processor accessing the driver and executing the driver for performing multiple steps. The steps include receiving point of purchase data from the point of sale device upon completion of a customer purchase; processing the purchase data to extract level III data from the point of purchase data; and transmitting the level III data to a print cloud managed by a host system. The host system includes at least one computer processor for managing point of purchase data within the print cloud in accordance with customer preferences.

BRIEF DESCRIPTION OF THE DRAWINGS

The present invention is described in detail below with reference to the attached drawings figures, wherein:

FIGS. 17A-17I include screen shots illustrating a receipt capture method in accordance with embodiments of the invention;

FIGS. 18A-F illustrate a method for facilitating long receipt capture with a tip overlay in accordance with an embodiment of the invention;

FIGS. 19A-19F illustrate a method for handling long receipts in accordance with an embodiment of the invention;

FIGS. 20A and 20B illustrate user interfaces for adding receipts in accordance with an embodiment of the invention.

DETAILED DESCRIPTION OF PREFERRED EMBODIMENTS

Embodiments of the present invention are directed to a system and method for capturing, storing, transmitting, analyzing, and displaying data associated with a purchase transaction.

Figure 1:
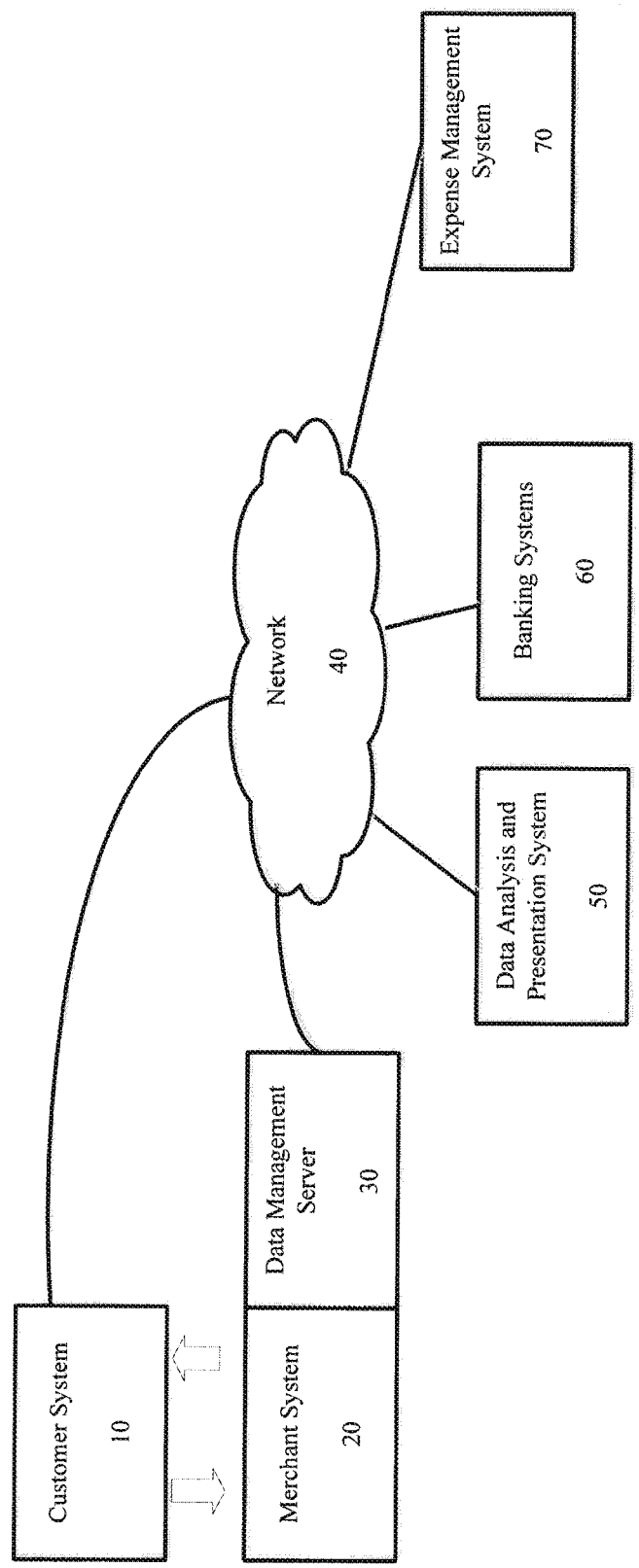
FIG. 1 is a block diagram illustrating an operating environment for a purchase data transmission and analysis system in accordance with an embodiment of the invention.

FIG. 1 is a block diagram illustrating an operating environment for a purchase data transmission and analysis system in accordance with an embodiment of the invention. A customer system 10 communicates with a merchant system 20. The merchant system 20 is associated with a data management server 30. A data analysis and presentation system 50, banking systems 60, and an expense management system 70 may all be connected over a network 40 with one another and the customer 10 and merchant 20 systems.

The customer system 10 interfaces with the data management server 30 and the data analysis and presentation system 50. The customer systems 10 may be or include any handheld mobile devices with internet access such as iPhones or other mobile, phones, tablets, or any other known devices. The customer systems 10 may alternatively include any other type of computing devices capable of performing the functions described herein. The customer systems 10 may execute downloadable applications for operating in conjunction with the data management server 30 and data analysis and presentation system 50. The downloadable applications may be stored in memory and executed by processors on the customer systems 10 and may provide a plurality of user interfaces to the customer systems 10. The downloadable applications may include, for example, applications that when executed, facilitate receipt capture using integral features of the customer devices. For example, the customer devices may include cameras, gyroscopes, and accelerometers. Image capture applications may leverage these integral features. The user interfaces may be or include those user interfaces described in conjunction with the FIGs. below.

The merchant system 20 may include point of sale equipment and other computing hardware and software. The POS equipment may encompass merchant systems including both traditional POS devices and online shopping systems accessible via the network 40 or another network. The merchant systems 20 may further be connected to POS devices in retail environments.

The merchant system 20 may include or be associated with the data management server 30. The data management server 30 may include or interface with POS equipment and/or the customer to collect and manage data and in particular to collect and manage Level III data described above. The data management server may be capable of defining URLs for accessing storage areas pertinent to purchases, wherein the storage areas include Level III data. The data management server 30 will be further described below with respect to FIG. 2.

The network 40 is preferably the Internet, but may be or include other types of networks. Furthermore, even though only one network is shown, multiple networks may be used. For example, customer systems 20 may communicate over a different network with expense management system 70, banking systems 60, and data analysis and presentation system 50 than with the merchant system 20, Further, merchant systems 20 may communicate over various networks with the banking systems 60. The network 40 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The data analysis and presentation system 50 may access data from the data management server 30 in order to analyze the data and present user interfaces for customers and merchants. In embodiments of the invention, customers and/or merchants may store applications for operating in conjunction with the data analysis and presentation system 50. The details of the data analysis and presentation system 50 are further described below with respect to FIG. 3.

The banking systems 60 include those computing systems commonly associated with financial institutions, such as account processing systems and credit card processing systems.

The expense management system 70 may be substantially as described in U.S. Pat. No. 7,949,579 and may be implemented in combination with embodiments of the invention. The expense management system 70 allows customers to view captured data and allocate transactions or a percentage of transactions to user-defined categories.

Figure 2:
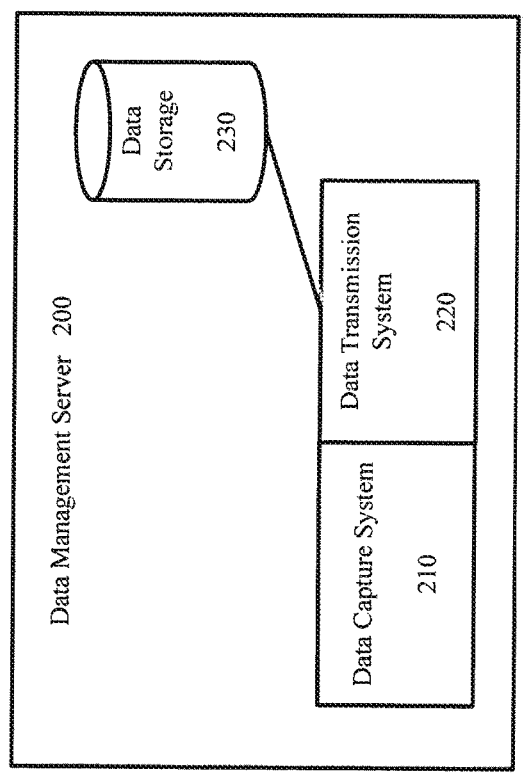
FIG. 2 is a block diagram illustrating a data management server of the purchase data transmission and analysis system in accordance with an embodiment of the invention.

FIG. 2 is a block diagram illustrating a data management server 200 of the purchase data transmission and analysis system in accordance with an embodiment of the invention. The data management server may include a data capture system 210, a data transmission system 220, and data storage 230.

The data capture system 210 may allow the merchant systems to archive POS data captured from each transaction. The POS data may be captured using known methods used by merchants for capturing and storing this data. The data capture system 210 may additionally accept receipt data or other data captured by customers and archive this data in connection with a transaction. Various methods for customer submission of data are described below. The data capture system 210 may store data for each transaction in a location that can be accessed via a URL. The URL may also be generated by the data capture system 210. The data capture system 210 may also capture product data from various sources and the data may include product information such as warranties or user manuals that may be linked to various transactions as appropriate.

The data transmission system 220 transmits information associated with the transaction. In embodiments of the invention, the information includes a URL associated with a transaction. The URL is preferably transmitted in a discretionary field of an authorization stream transmitted for bank card authorization. Accordingly, while the information transmitted is concise and consumes little space, it provides access to a large amount of data. On the web page accessible by the URL, the merchant may have the opportunity to create more engagement in order to drive the consumer back to the merchant web page. The current standard for transmitting data from a merchant's bank to a card Issuer's bank is ISO 8583 "Financial Transaction Card Originated Messages". Of course, the standard may be revised over time and other standards may be implemented.

The data storage area 230 stores the captured data in any convenient type of storage device. The data storage area 230 may include any hardware device suitable for storing the data and may further implement database tools for management of the data. The data storage area 230, data transmission system 220, and data capture system 210 may be integrated or separate systems and may include one or more processors or memory devices executing instructions for storing the data, creating a reference, such as a URL, for referencing the data, and for combining the URL with authorization data by inserting it in a discretionary field of the authorization stream. Other engines, components, or systems may also be included.

The engines and systems described above may include software components including instructions executed by a programmed processor to perform the functions described. The engines may include or access databases stored in computer memory to obtain data necessary for execution of instructions. Databases may be provided and accessed both within financial services computing systems and outside of the financial services organization.

Figure 3:
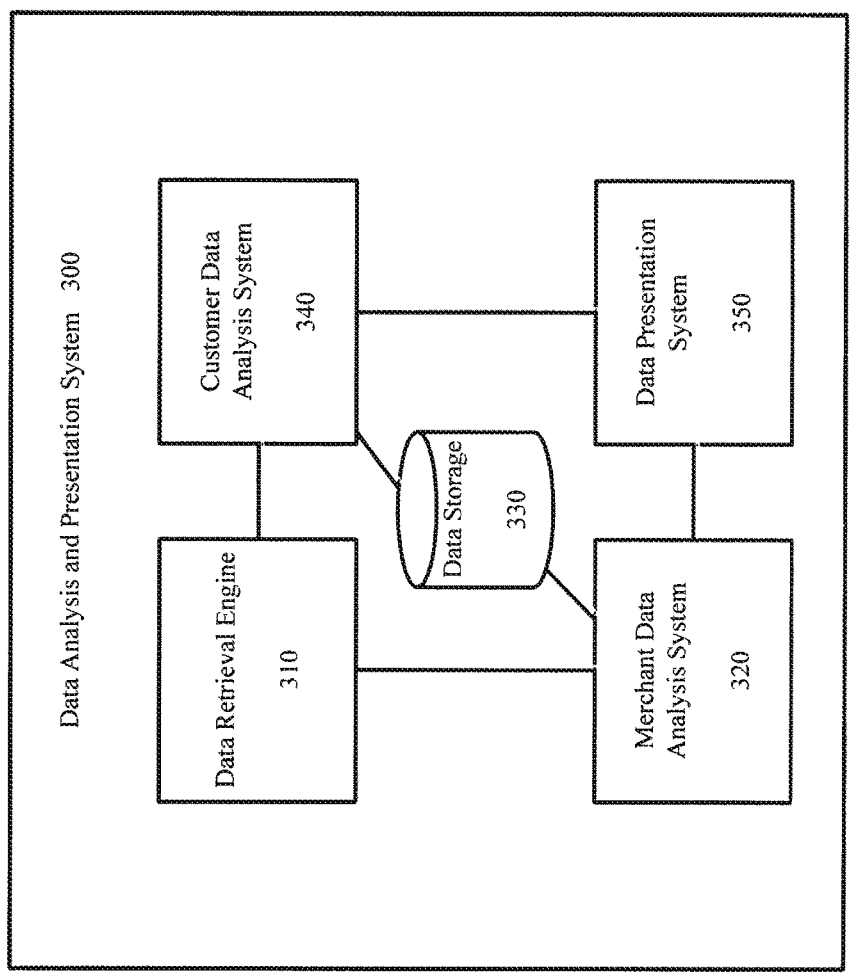
FIG. 3 is a block diagram illustrating a data analysis and presentation system of the purchase data transmission and analysis system in accordance with embodiments of the invention.

FIG. 3 is a block diagram illustrating a data analysis and presentation system 300 of the purchase data transmission and analysis system in accordance with embodiments of the invention. The data presentation and analysis system 300 may include a data retrieval engine 310, a merchant data analysis system 320, data storage 330, a customer data analysis system 340, and a data presentation system 350.

The data retrieval engine 310 is provided in order to retrieve data associated with transmitted URL references. The data retrieval engine 310 may also retrieve additional data, such as product data or customer data from other sources if the data is not already stored in association with the transmitted URL.

The merchant data analysis system 320 implements the provided data to provide predictive analysis and marketing opportunities for merchants. For example, the merchant data analysis system 320 may analyze trends and provide marketing opportunities in accordance with the trends. Furthermore, the merchant data analysis system 320 may analyze customer behavior to optimize marketing opportunities for the merchant. The merchant data and analysis system 320 preferably provides the data and analysis through user interfaces customized for the merchants.

The data storage area 330 may store trend and analysis information as well as any other data or applications that may be repeatedly used by the data analysis and presentation system 300.

The customer data analysis system 340 provides analysis of retrieved and stored data in order to improve the customer experience. The analysis may yield rewards information, special offers, recommendations, and other items of interest to the customers. The customer data analysis system 340 preferably provides the information via user interfaces designed for the customers. The customer data analysis system 340 may be further configured to allow input from customers to correct data perceived to be incorrect. In embodiments of the invention, the customer may have a selectable option to submit an in investigation request into data that appears to be incorrect. For example, a transaction amount may have been recorded incorrectly or an entire transaction may be viewed as fraudulent. In embodiments of the invention, customers may permitted to correct this data manually via a correction interface. In this instance, the data analysis system 340 may retain the original with a record of the correction, so that the user can review any corrections made against the original.

The customer data analysis system may 340 may further provide search, sort, and retrieval functionality. Sorting and filtration may be accomplished, for example, with any field associated with Level III or other parameters. For example, searching and sorting may be accomplished by transaction amounts, transaction dates, and transaction times.

The data presentation system 350 may supply user interfaces and/or configure data for presentation. The data presentation system 350 may further configure the data dependent upon the receiving device requesting the configured data. For example, mobile devices may receive a different interface than the interface provided by a desktop computer. Exemplary user interfaces will be further described below.

The data analysis and presentation system 300 may provide value for consumers and merchants. For example, the system may provide product level applications useful for product accessories marketing, related product marketing, notifications for extending warranties, recall notification, product documents & manuals, tracking life of warranties, product reviews and upgrades, rebate notification, social integration, receipt printing and receipt bundling for expense submissions. In preferred embodiments of the invention, this information may be accessed through provided embedded links. The system may also be useful for providing auditing and reimbursement for tax claims. Embodiments of the invention can also provide fraud protection for thwarting identity theft. Consumers would realize almost instantly if someone was using their card numbers without their permission. Further benefits to the customer include budget, expense tracking, and bookkeeping information. For example, information may be presented in various formats, such as spend by category, spend by day/month/year, or spending by custom tags format. The system may also provide offers and coupons based on SKU level targeting and the offers may also be personalized based on the product and brand. Consumer statements may be prepared so as to be enriched with item level data. Budgeting may be provided based on defined categories. A searchable repository of receipts and merchants may further be provided. The system may also provide invoicing integration for small businesses including expense reporting and reimbursement functions. Other features that may be provided include currency conversion, spend analytics and integration with third party applications via application program interfaces.

For the benefit of the merchant, aggregated consumer purchase data may be provided to show trending products. Furthermore, analysis of purchase data may illustrate variation in products purchased based on weather, time of year, or day of the week. This data is valuable in that the system can provide the merchant with recommendations for offers based on this data. Also, the system may provide suggestions to the merchant for each customer based on the customer profile. Customer behavioral patterns may illustrate that a customer is nearly certain to purchase a particular item if it is offered at a particular price.

Figure 4A:
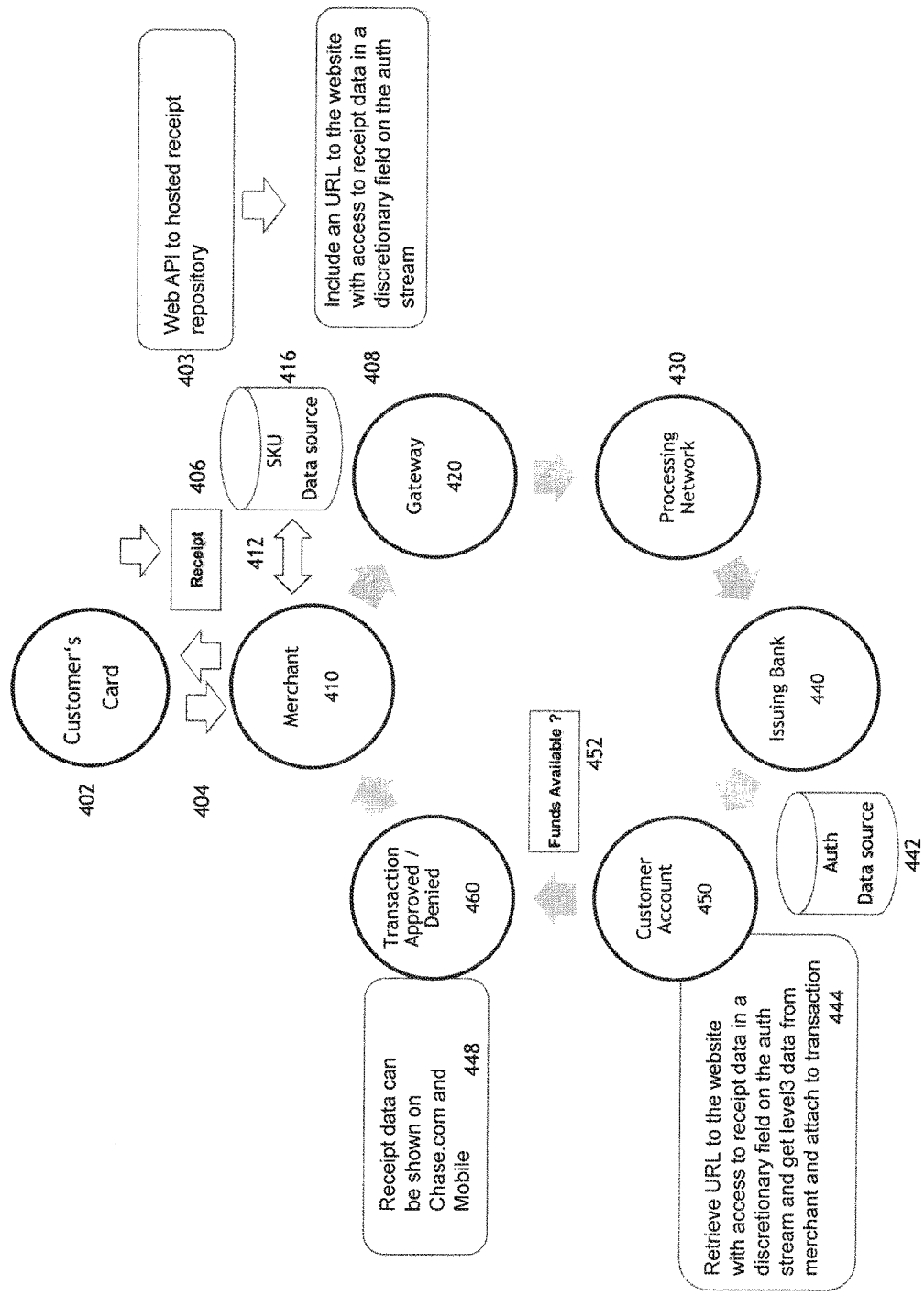
FIG. 4A is a flowchart illustrating a purchase data transmission and analysis method in accordance with an embodiment of the invention.

FIG. 4A is a flowchart illustrating a purchase data transmission and analysis method in accordance with an embodiment of the invention. The system participants include a customer with a bank card 402, a merchant 410, a gateway 420, a processing network 430, an issuing bank 440, a customer account 450, a SKU data source 416, and an authorization data source 442.

The customer with the bank card 402 makes a purchase from the merchant 410 and obtains a receipt 406. The merchant 410 may interact at 412 with the SKU data source 416. The generated receipt 406 may be stored in a repository accessible by a URL. In its request for authorization through the gateway 420, the merchant 410 may include the URL referencing the receipt in a discretionary field on the authorization stream. The authorization stream may be passed through the usual channels including processing network 430 and issuing bank 440 which communicates with the authorization data source 442 for the customer account 450. The issuing bank may retrieve the URL to the website containing the receipt data. Accordingly, the use of the receipt data in a discretionary field of the authorization stream allows access to level III data from the merchant. The system can attach the retrieved data to the transaction at 444. The transaction is approved or denied at 460 and receipt data can be shown on a user interface at 448. User interfaces may be provided on a customer system such as a customer mobile device and also on a merchant system.

Figure 4B:
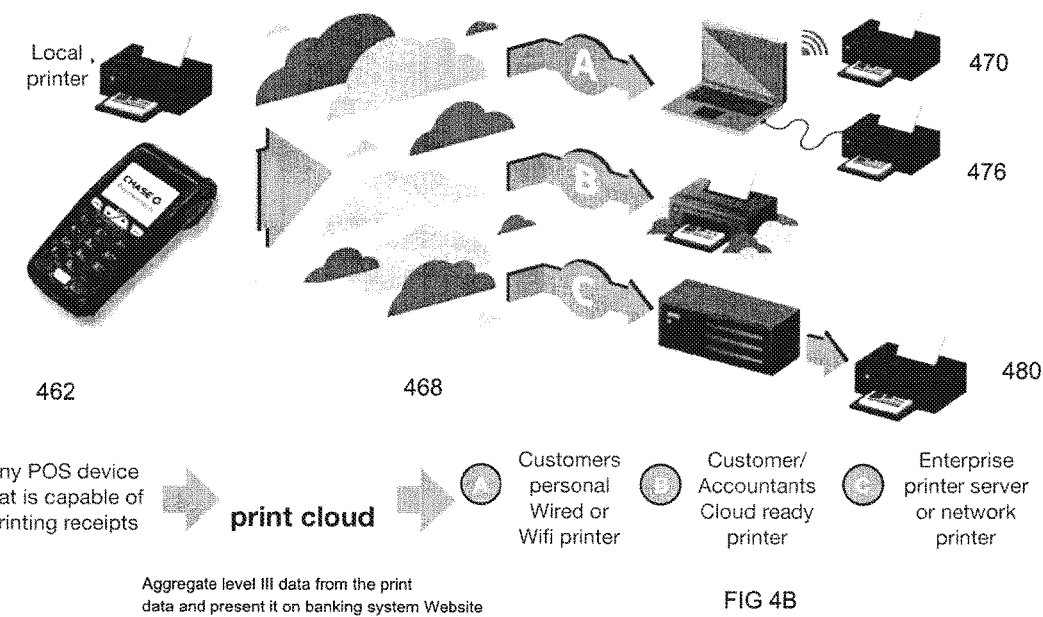
FIG. 4B is a flowchart illustrating an additional method for obtaining purchase data in accordance with an embodiment of the invention.

FIG. 4B is a flowchart illustrating an additional method for acquiring purchase data in accordance with an embodiment of the invention. Purchase data originates at a POS 462 that is capable of printing receipts. The POS may transmit the data including Level III data to a print cloud 468 hosted by banking systems or other systems having an interest n hosting the data. The customers may access the data in the cloud or have the data transmitted to the customer personal wired or wifi printer 470. The data may be further transmitted to a customer or accountants cloud ready printer 476 or an enterprise printer server or network printer.

Thus, in order for the data to originate at the POS, a customers typically go to the POS and swipe their credit cards. The card could be a card from any financial institution and the POS may include a payment terminal be operated by a payment processor. The POS includes a driver supporting the functionality described herein. Thus, the driver, when executed at a processor of the merchant printing system, captures the Level III data at the POS and ensures that the data is transmitted to the print cloud 468. Printer Job Language (PJL) controls the print queue when a job is transmitted to the printer. PJL provides instructions to the printer and creates postscript (PS), which is a file that printers understand in order to transfer data to paper. After the level III data is extracted out of the PS data, the print cloud 468 determines where the merchant data is coming from (i.e., where the card was swiped) and it matches the receipt to the transaction, the payment card, and the customer. Functionality within the print cloud 468 may read a profile of the matched customer within the system hosting the cloud. The customer may, for example, set preferences through the system hosting the cloud. The customer might set preferences to have the receipt sent directly to a customer account and forgo printing of the receipt. Although not shown in FIG. 4B, the customer account destination can be integrated with, or accessible to the print cloud 468 over a network. A customer can also request that the merchant execute these preferences and rather than taking a printed receipt, the customer can walk away knowing that the receipt has been transmitted to the customer account.

The functionality of FIG. 4B enables the system to collect the Level III data without soliciting it from the merchant. The print cloud host may supply the driver and POS equipment. Capture of the data in this manner is also actual readable data rather than OCR data. This method can be implemented at any type of retail establishments that have POS equipment.

As POS equipment evolves, customers may be able to convey their receipt preferences to the POS at point of sale instead of or in addition to at the print cloud 468. For example, the POS may be capable of gesture based recognition and customers may be able to gesture to pull their receipts into their mobile devices. The POS equipment may additionally or alternatively be capable of recognizing a QR code, so that customers can hold the QR code up to the POS enabling the POS to read the QR code and send the receipt accordingly.

The print cloud 468 may be offered by a host system and may be combined with functionality to enable direction of Level III data to an appropriate destination. In some embodiments, the customer sets the preferences to indicate the appropriate destination. In other embodiments, the card issuer or the print cloud host may set the appropriate destination. Once the receipt is matched with the customer account, the system performs reconciliation automatically. In embodiments of the invention, the customer accounts may be provided with multiple buckets for matching. For example, in a joint account, one owner may want to separate purchases related to his hobby from purchases related to the joint owner's schooling expenses. The host system may have the automatic functionality to distribute the receipt from the cloud to a proper account bucket. Account holders may secure the buckets so that only one joint owner may be able to view certain receipts, as either account holder may be capable of "suppressing" data.

The method of FIGS. 4A and 4B are primarily directed to purchases made in stores or brick and mortar establishments. Ecommerce receipts are typically easier to generate and collect, since the collection of data from emails is relatively straightforward. Because online receipts have a particular format, the system may recognize them, extract them and direct them to an appropriate destination. Despite the varying capture mechanisms, the management, analysis and display of receipts may be accomplished similarly whether the receipts are captured at a POS or online.

All of the components shown in FIGS. 1-4 above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 5:
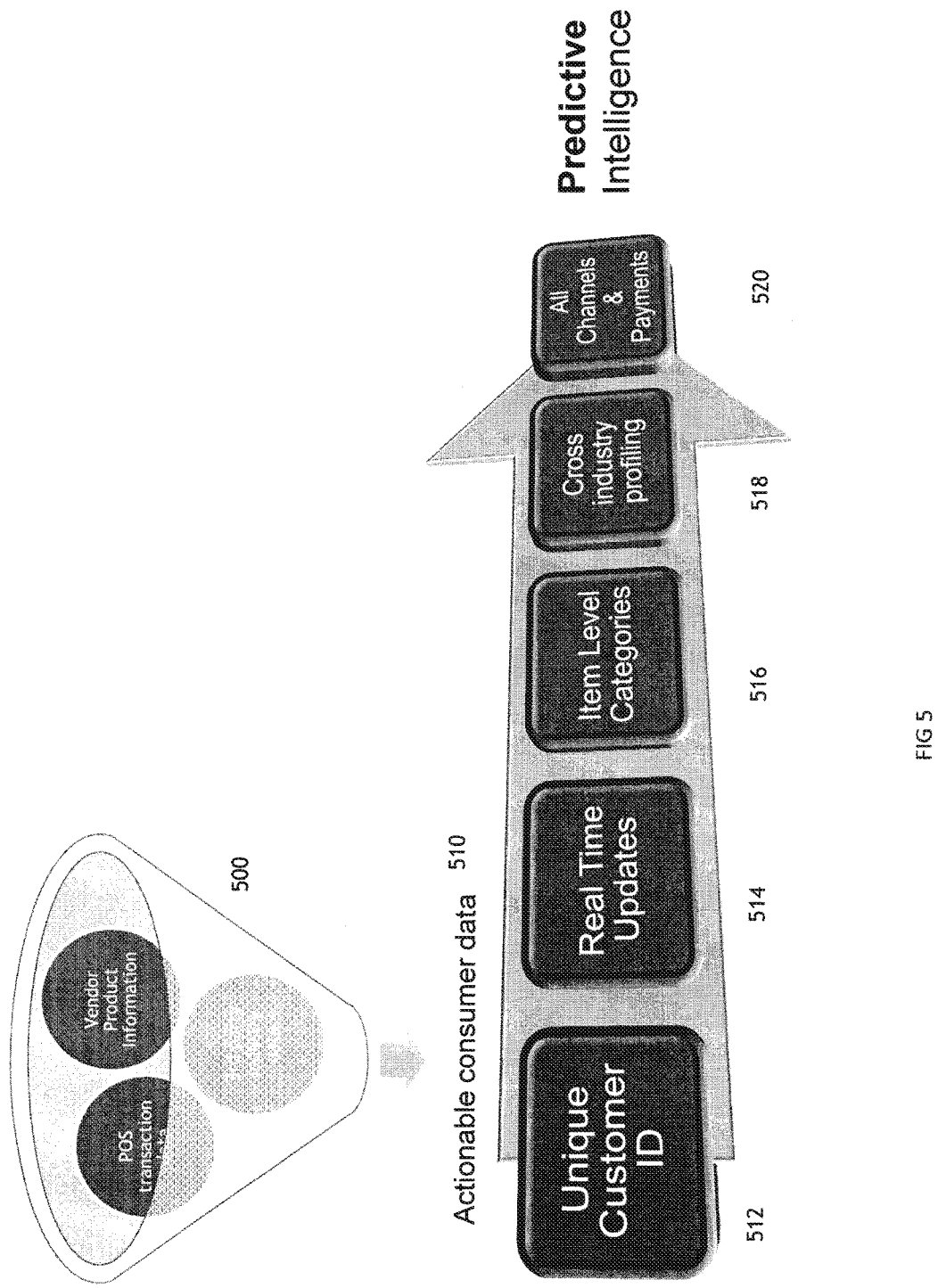
FIG. 5 is a flow diagram illustrating data collection and analysis in accordance with an embodiment of the invention.

FIG. 5 is a flow diagram illustrating data collection and analysis in accordance with an embodiment of the invention. In addition to the POS transaction data, the system may also collect vendor product information and third party industry data 500. This data may be collected from connected manufacturer systems or other available sources. The data may be combined and analyzed to create actionable consumer data 510. The data 510 may include a unique customer ID 512, real time updates 514, item level categories 516, cross industry profiling 518, and all channels and payments 520. The ability to collect and combine the data results in an improved predictive intelligence for merchants. In embodiments of the invention, the customers may able to access the manufacturer system information, such as user manuals, product warranties, etc., through embedded links, that may direct the customers to URLs containing the desired information.

Figure 6A:
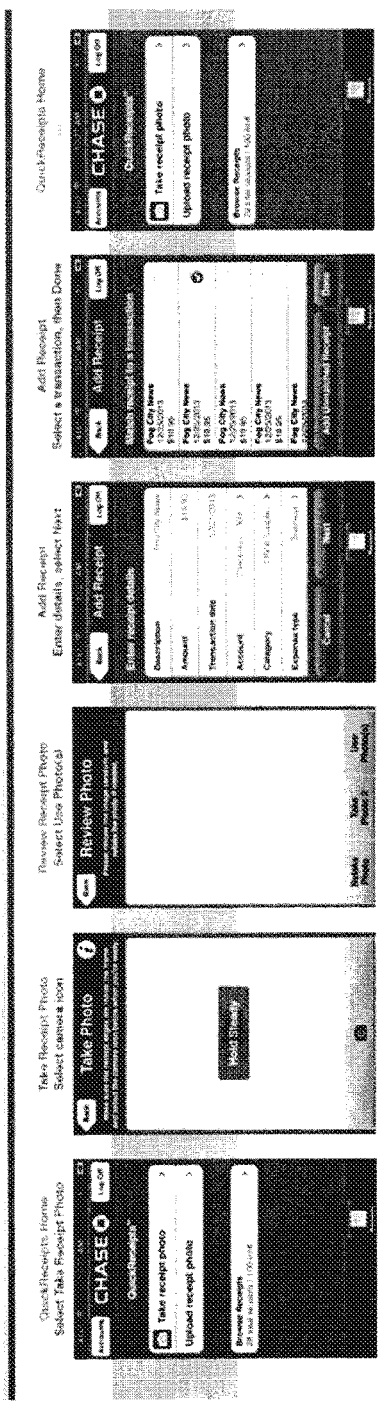
FIGS. 6A and 6B illustrate a series of user interfaces implemented by a customer for data collection in accordance with an embodiment of the invention.
Figure 6B:
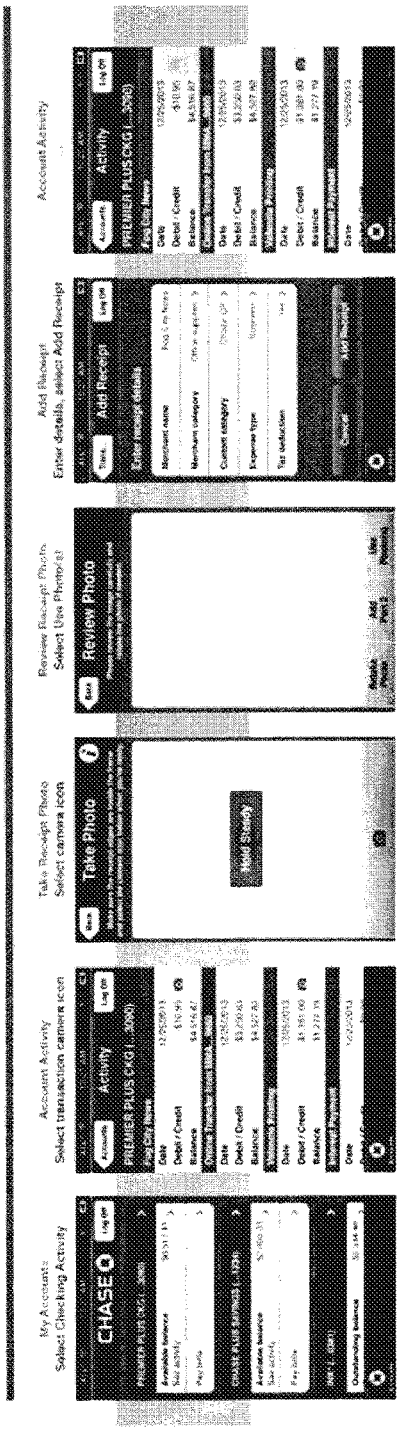

FIGS. 6A and 6B illustrate a series of user interfaces implemented by a customer for data collection in accordance with an embodiment of the invention. In FIG. 6A, a user implements a receipt collection application to take and upload a receipt photo at 600. A photo capture instructional screen is shown at 610. A review interface 620 may be provided upon capture. The user may be provided with an interface for adding details to the captured receipt at 630. The receipt may be matched to a transaction at 640 and the user may be returned to a home screen at 650.

FIG. 6B illustrates an account interface 652 and an account activity interface 656. From the account activity interface 656, a photo capture interface 660 is provided. A review interface 670 may be provided for photo review. An add receipt interface 680 allows the user to enter additional details into the receipt and the user is returned to the account activity interface at 690.

The interfaces shown in FIGS. 6A and 6B may allow customers to store captured information in a particular location that will be accessible through the transmitted URL described above with respect to FIGS. 2 and 4. While in some embodiments of the invention, the merchant may generate and store the data, in other embodiments, the customer may store the generated receipt data. In embodiments of the invention, the customer may be given the opportunity to suppress items displayed on the receipt. In other words, the customer may make multiple purchases including gift purchases for family members, or other items the customer might want eliminate from user interfaces, such as cigarette or alcohol purchases, or personal items purchased with a business credit card. Customers may be given the option to suppress this data to eliminate it from further analysis or display. In embodiments of the invention, the customer may still store and access this data through specially provided mechanisms such as passwords, security questions, or other security features.

Figure 7:
FIG. 7 is a photograph illustrating receipt capture in accordance with an embodiment of the invention.

FIG. 7 is a photograph illustrating a receipt capture method 700 in accordance with an embodiment of the invention. In the illustrated scenario, a user implements an iPhone® camera to capture the receipt. In a preferred embodiment, the receipt may be stored in a vault accessible to mobile devices.

Figure 8:
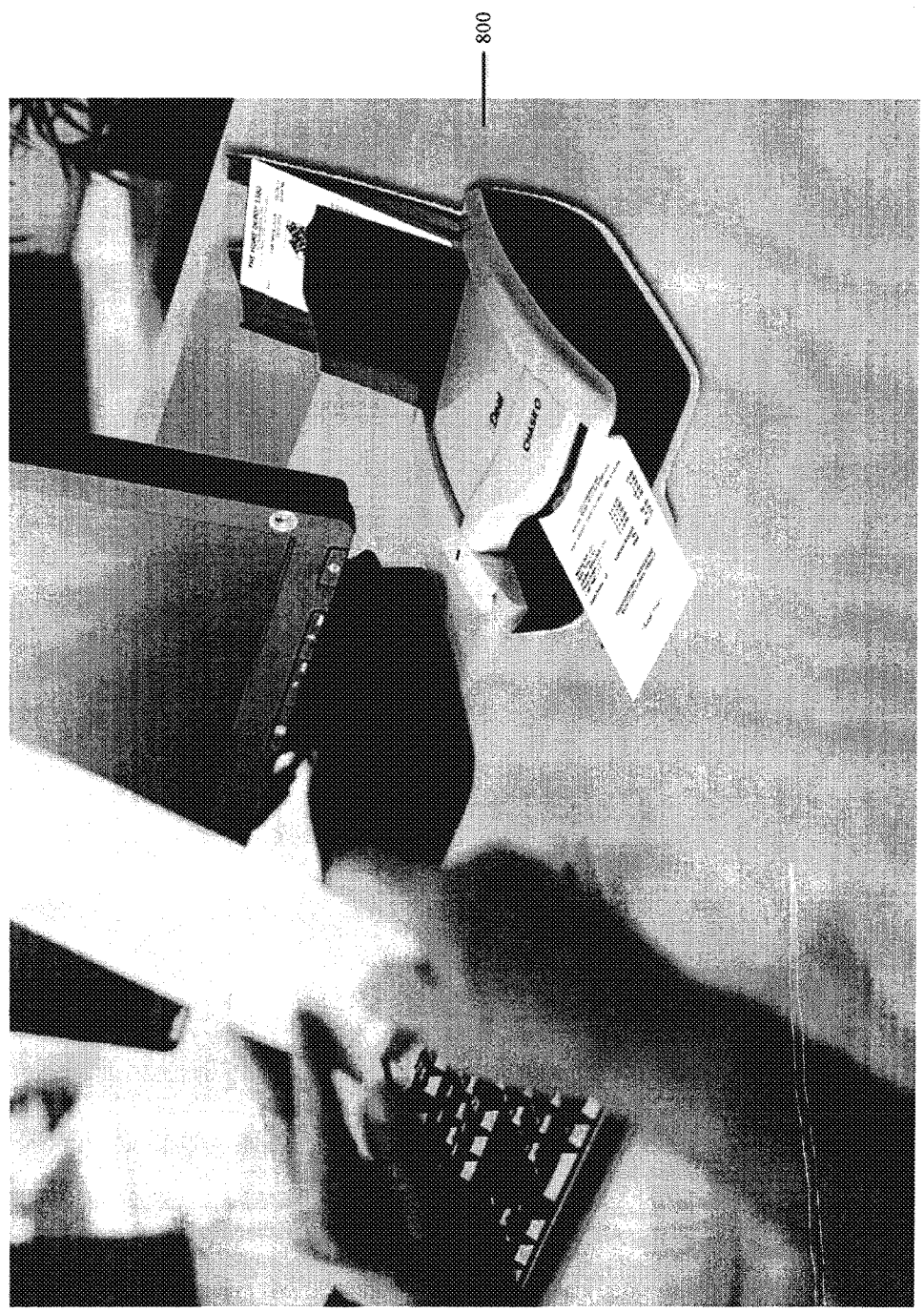
FIG. 8 is a photograph illustrating a receipt capture method in accordance with embodiments of the invention.

FIG. 8 is a photograph illustrating a receipt capture method 800 in accordance with embodiments of the invention. In this embodiment, a desktop scanner is configured for digitally archiving receipts, This technique may be useful for lengthy receipts that are difficult to image in their entirety with a mobile device. However, in further embodiments of the invention described below with reference to FIGS. 16-18, an enhanced method is provided for customer capture of lengthy receipts. Capture techniques for lengthy receipts may be used, for example, for any receipts having a length that cannot be captured with a single photograph from a camera on a mobile device, or other device, such that its content is legible.

Figure 9:
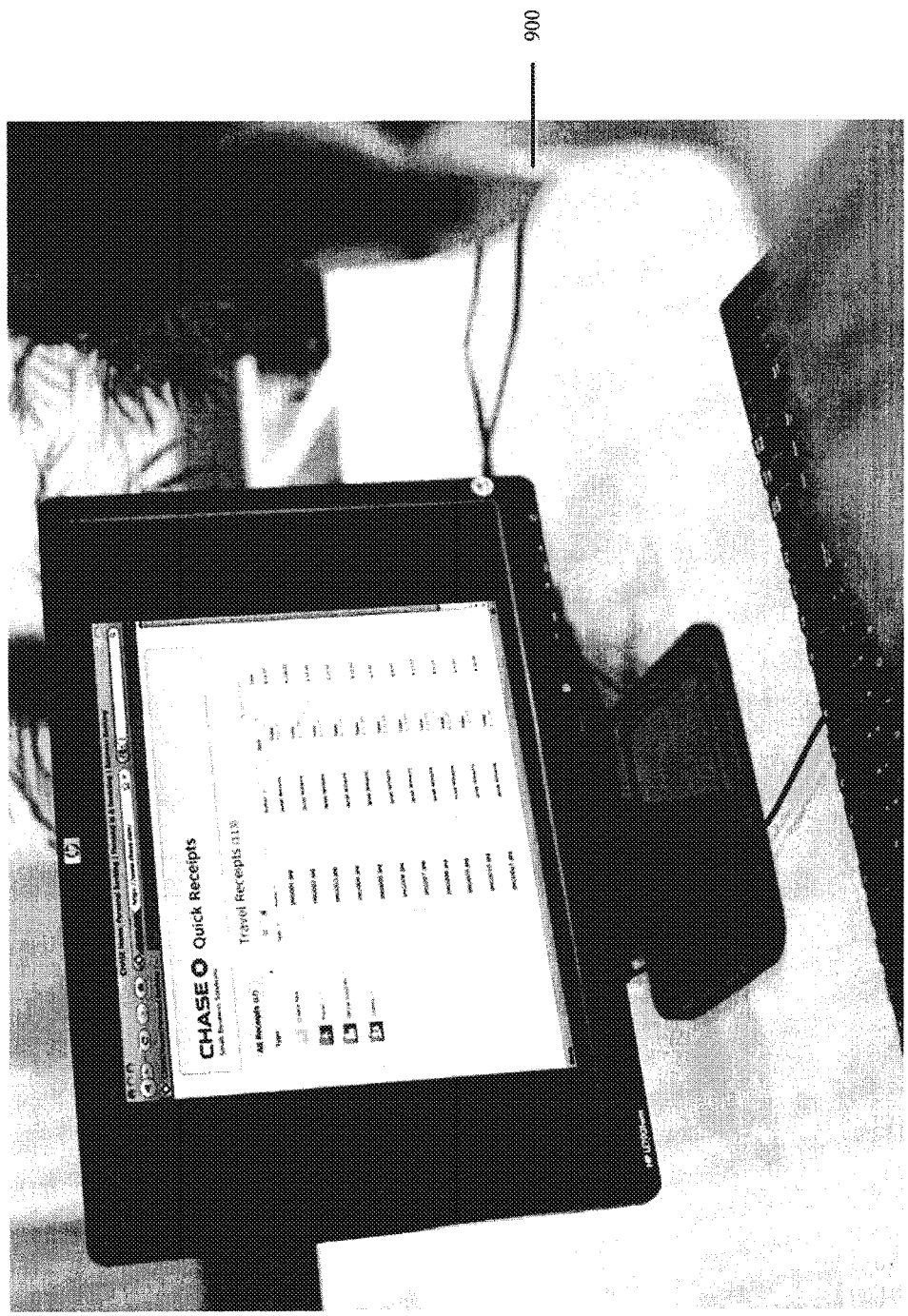
FIG. 9 is a photograph illustrating a user interface for navigating captured receipts in accordance with an embodiment of the invention.

FIG. 9 illustrates a user interface 900 for navigating captured receipts in accordance with an embodiment of the invention. The user interface may allow customers, such as business owners, to easily access and view their receipt history from any computing device. The system preferably interfaces with other systems, such as Quickbooks™, keeping all categories in tact between applications.

Figure 10:
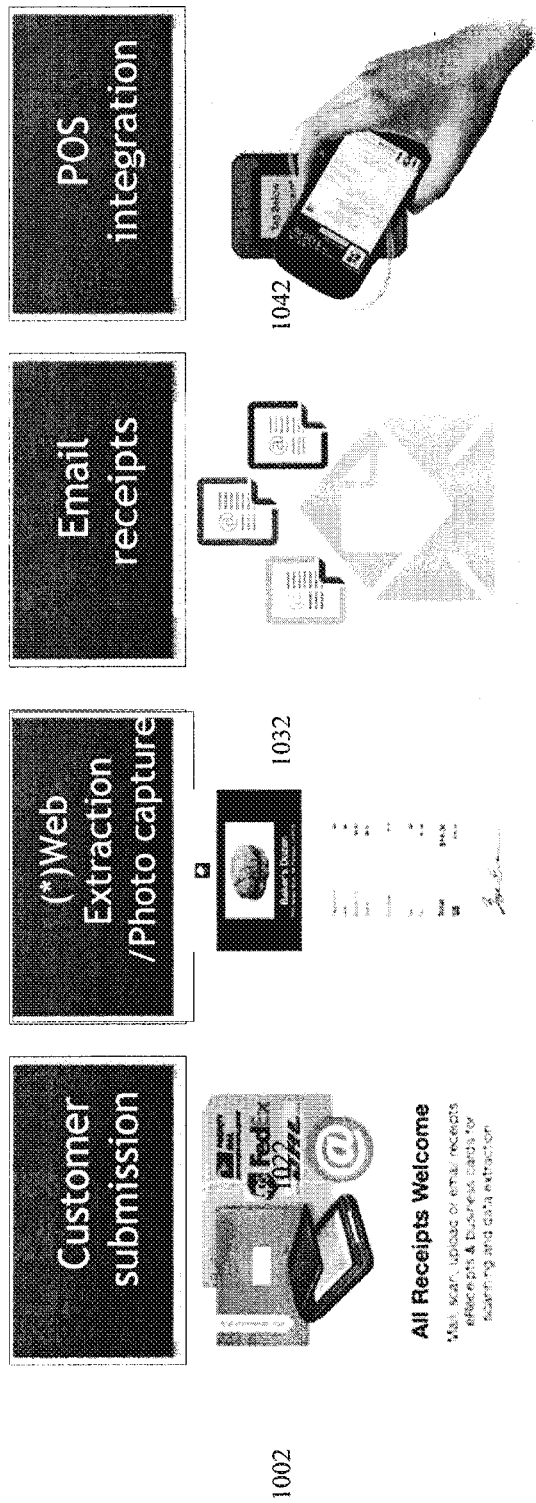
FIG. 10 illustrates multiple methods for entering receipts into the purchase data transmission and analysis method in accordance with an embodiment of the invention.

FIG. 10 illustrates multiple methods for entering receipts into the purchase data transmission and analysis system in accordance with an embodiment of the invention. Customer submissions 1002 may be mailed scanned, uploaded or emailed. The submissions may include receipts, eReceipts, business cards, or other information, such as product information and warranties for scanning and data extraction. Methods of submission may, for example, include submission by photo capture 1022, submission by email 1032, and POS integration 1042.

Figure 11:
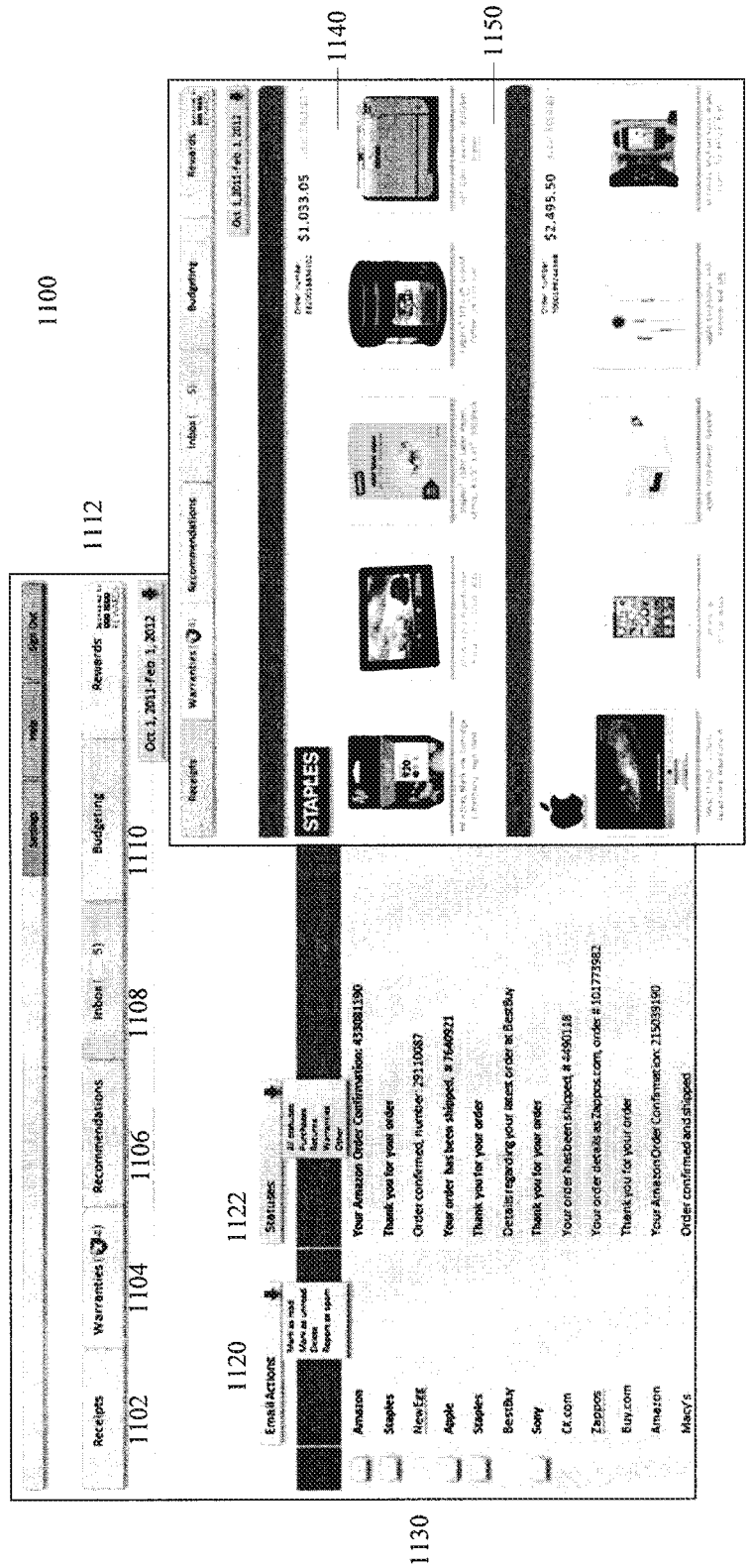
FIG. 11 is a user interface illustrating a product information page produced through the purchase data transmission and analysis system in accordance with an embodiment of the invention.

FIG. 11 is a user interface illustrating a product information page 1100 produced through the purchase data transmission and analysis system in accordance with an embodiment of the invention. This user interface is an example of a configuration of information that may be prepared by the customer data analysis system described above in connection with FIG. 3. Provided tabs may include receipts 1102, warranties 1104, recommendations 1106, inbox 1108, budgeting 1110, and rewards 1112. An inbox 1130 may include various emails for purchases made and orders placed. The emails may include notifications that a product was ordered and that a product was shipped. The inbox 1130 may provide for email actions 1120 and statuses 1122. Statuses may be checked for purchases, returns, warranties, other, or all items in combination. Interfaces 1140 and 1150 may include receipts interfaces for various purchases from participating merchants. The interfaces of FIG. 11 may allow customers to view return and exchange policies, view savings, print receipts, tag products/SKU, view offers, view product information, share product information, rate and view product ratings, and view nutrition facts for example.

Figure 12:
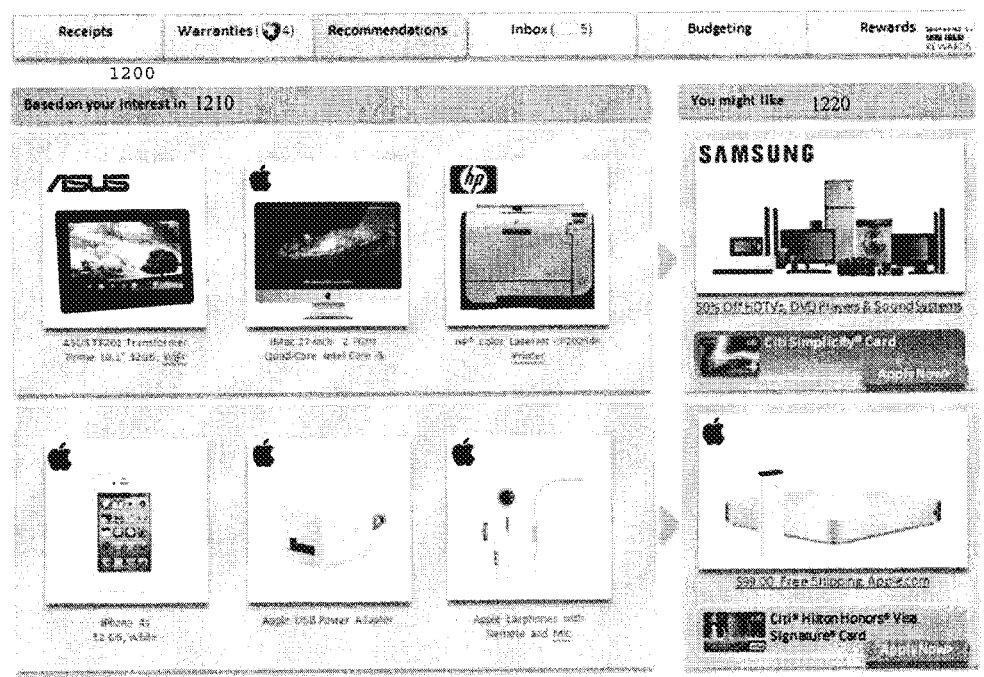
FIG. 12 is a user interface illustrating personalized offers and rewards produced through the purchase data transmission and analysis system in accordance with embodiments of the invention.

FIG. 12 is a user interface illustrating a recommendations interface 1200 produced through the purchase data transmission and analysis system in accordance with embodiments of the invention. Information in the user interface may be prepared by the customer data analysis system as described above and presented by the data presentation system. The recommendations interface 1200 may provide an indicator of products previously purchased or viewed at 1210 and based on these products may suggest products 1220. The interface provides a cross selling opportunity, may provide coupons and relative product information, and may further provide special offers for the recommended products.

Figure 13:
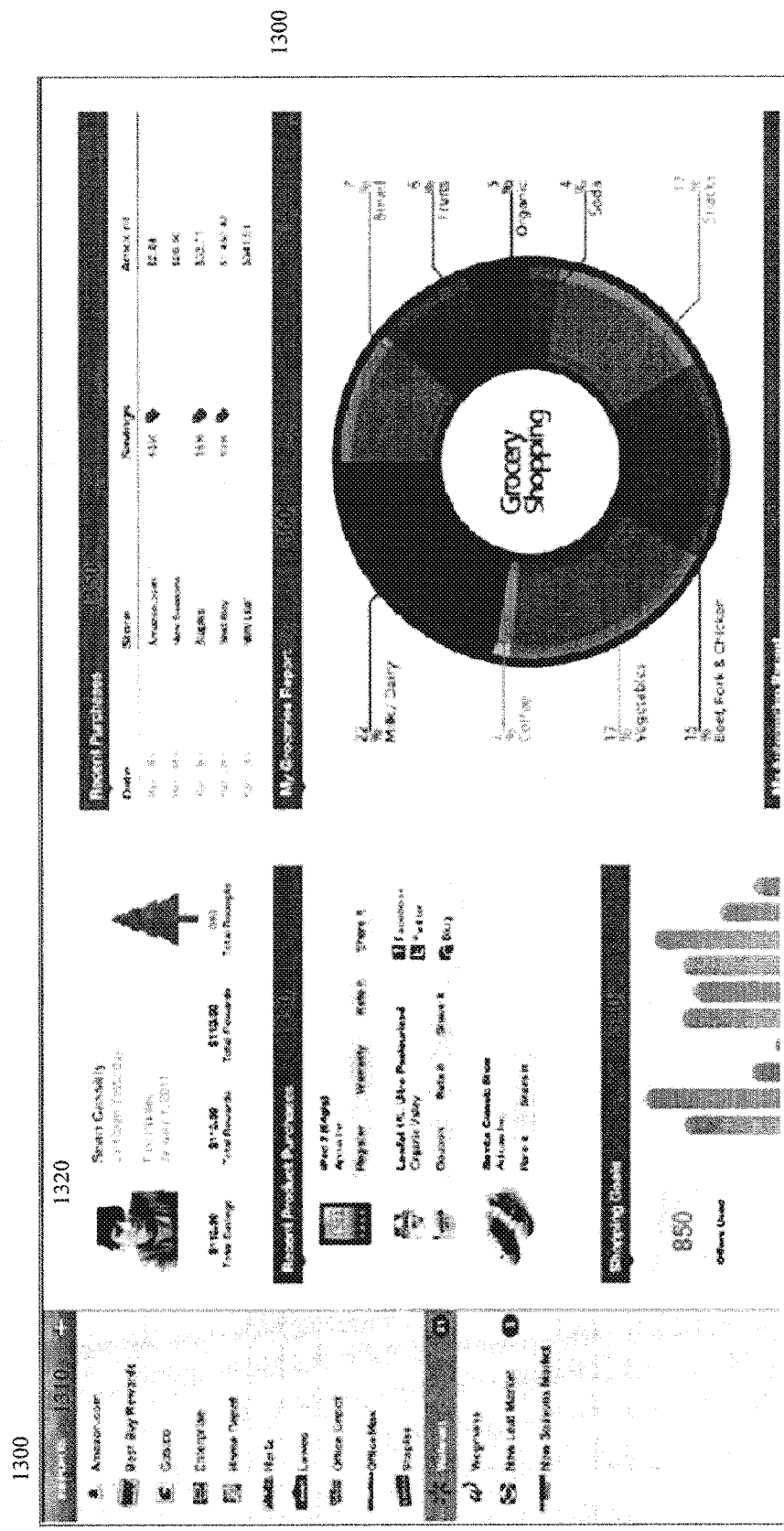
FIG. 13 is a user interface illustrating a personalized dashboard and spending analysis displayed by the purchase data transmission and analysis system in accordance with embodiments of the invention.

FIG. 13 is a further example of a user interface 1300 including information prepared by the customer data analysis system. The user interface includes a personalized dashboard and spending analysis interface displayed by the purchase data transmission and analysis system in accordance with embodiments of the invention. The interface 1300 may include reports 1310 from multiple merchants, and a profile section 1320 profiling the customer savings, rewards, purchases, receipts, etc. The interface 1300 may also include a section 1350 reporting recent product purchases, and a shopping goals section 1340. The shopping goals section 1340 may provide an indication of the number of offers made and a number of offers used. The recent purchases section 1350 may provide dates, merchant, savings, and amounts of recent purchases. With the SKU level data collected, detailed sections such as a grocery shopping report 1360 may be provided. This section breaks product purchases down by category.

Figure 14:
FIG. 14 is a user interface illustrating merchant analytics produced by the purchase data transmission and analysis system in accordance with embodiments of the invention.

FIG. 14 is a user interface 1400 illustrating merchant analytics produced by the purchase data transmission and analysis system in accordance with embodiments of the invention. These analytics may provide a useful tool for merchants to build their customer bases. A section 1410 provides a number of subscribers and loyalty members, a percentage of recent customers, average purchases, and total loyalty revenue from a particular quarter or other time period. For example, quarters or months may be selected at 1420. A customer breakdown by days since last visit may be provided at 1430. A section 1440 may be provided for winning back lapsed customers. This section may give the total number of lapsed customers as well as a total win-back dollar value. A section 1450 may identify types of customers.

Figure 15:
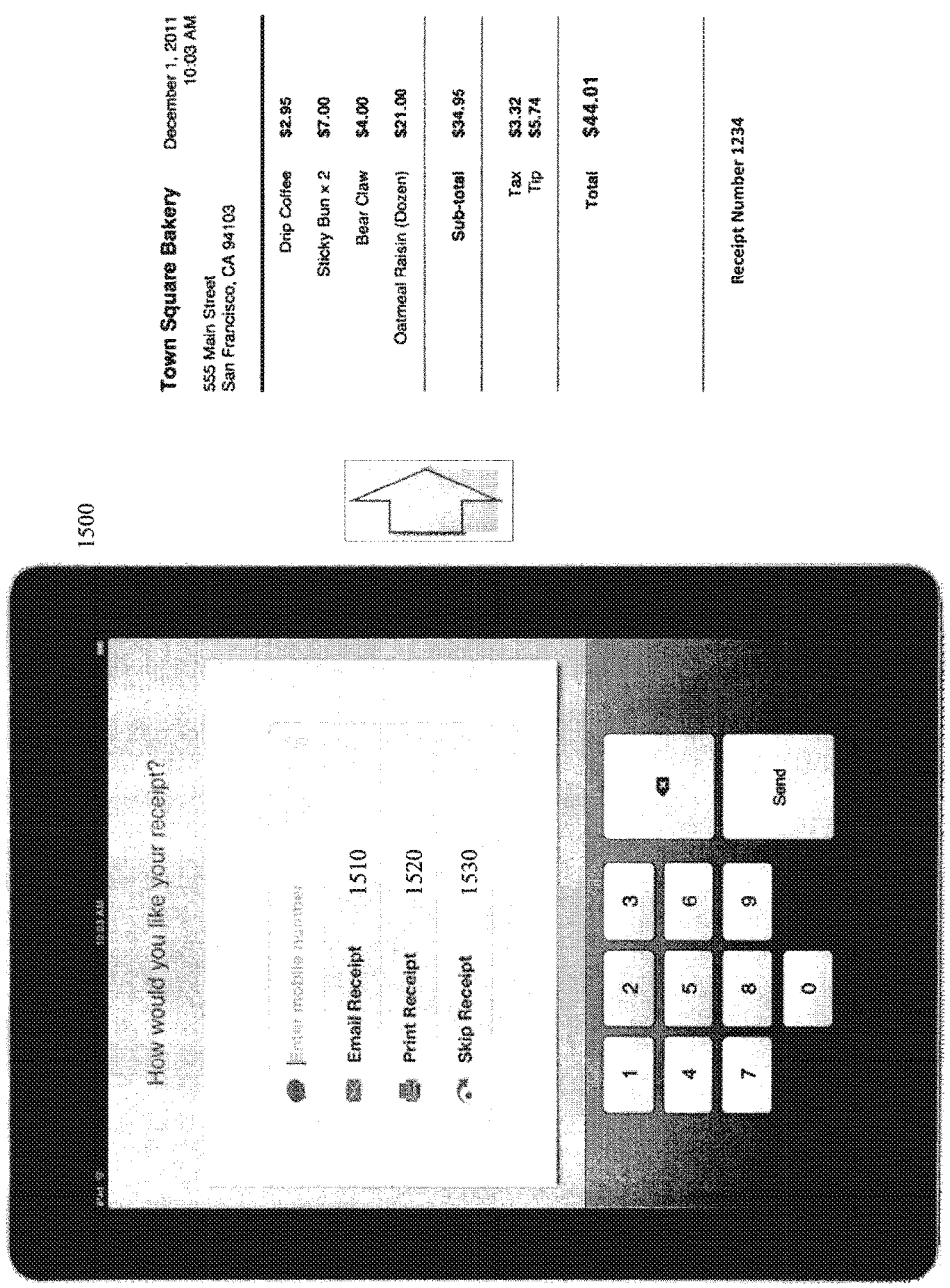
FIG. 15 is a user interface illustrating a receipt handling mechanism provided by the purchase data transmission and analysis system in accordance with embodiments of the invention.

FIG. 15 is a user interface 1500 illustrating a receipt handling mechanism provided by the purchase data transmission and analysis system in accordance with embodiments of the invention. In embodiments of the invention, customers may be provided with the opportunity to select whether to receive any receipt and what actions to take with receipts. For example, the customer may select option 1510 to email a receipt, option 1520 to print a receipt, and option 1530 to skip a receipt entirely. The act of skipping a receipt may save waste and save money for the merchants. The details of a receipt may be viewable at 1540, for example through email. Whether or not the customer receives a printed receipt, the customer will be able to view and transmit purchase data. Accordingly, either the customer, the merchant, or both the customer and the merchant may be able to supply data to be stored in a location referenced by the URL that is ultimately transmitted by the merchant during the credit card authorization process.

Figure 16:
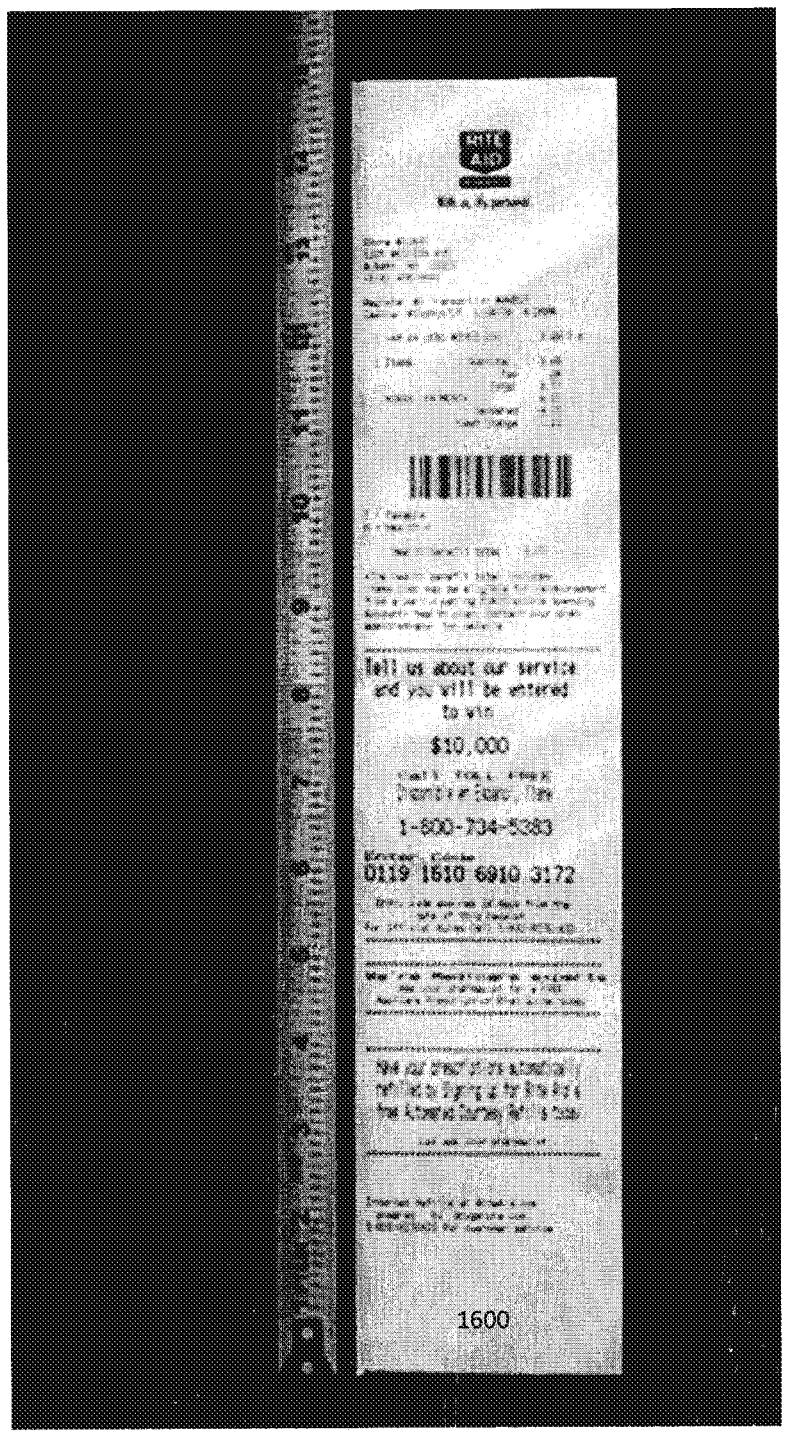
FIG. 16 is an illustration of a long receipt that may require capture in accordance with embodiments of the invention.

FIG. 16 is an illustration of a long receipt 1600 that may require capture in accordance with embodiments of the invention. Capture of such long receipts can present additional complexities with respect to the user interface for receipt capture as well and with respect to complete capture of data. As illustrated in FIG. 8, it is possible to use a desktop scanner to scan lengthy receipts. However, as is further explained below, it is also possible to capture these lengthy receipts with a mobile image capture device.

FIGS. 17A-17I include screen shots illustrating a receipt capture method in accordance with embodiments of the invention. The illustrated method is intended to minimize interaction and simplify the process of capturing all information contained in long receipts. FIG. 17A illustrates a receipt capture interface 1700 through which a user may select an "add receipt" option 1709. The user interface 1700 includes a cancel option 1702, a new transaction 1704, and options for categorizing transactions and adding receipts 1706.

When a user chooses to add a receipt at 1709, an interface 1710 of FIG. 17B may be displayed. The interface 1710 may allow the user to take a photo 1712, choose a photo from a library 1714, or cancel the operation at 1716.

If the user chooses to take a photo, an interface 1720 of FIG. 17C may be displayed. Using camera icon 1724, the user may capture an image of a receipt at 1722. In FIG. 17D, a captured receipt 1732 is displayed along with transaction details. User options 1734 include options to replace, go to next, or finish capture. If the receipt is a long receipt and was not entirely captured through initial image capture as displayed on the interface, the user will elect to add another part.

Assuming that the user elects to go to the next portion of the receipt, an interface 1740 of FIG. 17E may be displayed to capture a remaining portion 1744 of the receipt. A guide 1742 allows this portion of the receipt to be matched with the previously captured portion of the receipt. The user may capture the image using a camera icon 1746.

Upon capture, the image and transactions details 1752 may be shown in user interface 1750 of FIG. 17F. The user may again be given options to replace, go to next and finish at 1754. Assuming the user elects to go to a final portion of the receipt, a user interface 1760 of FIG. 17G may be shown. The image of 1762 may be matched with the previous imaged and captured at 1764.

In FIG. 17H, a user interface 1770 illustrates the captured portion of the receipt 1772 and options 1774 to replace or finish capture. Because the receipt has been fully captured, the "next" option may not be displayed. Assuming the user elects to finish the process, a full image may be displayed in FIG. 17I. A user interface 1780 displays a fully captured image 1782. To accept the fully captured image 1782, the user may select an "okay" option 1784.

Upon capture, the image and transactions details 1752 may be shown in user interface 1750 of FIG. 17F. The user may again be given options to replace, go to next and finish at 1754.

Figure 21:
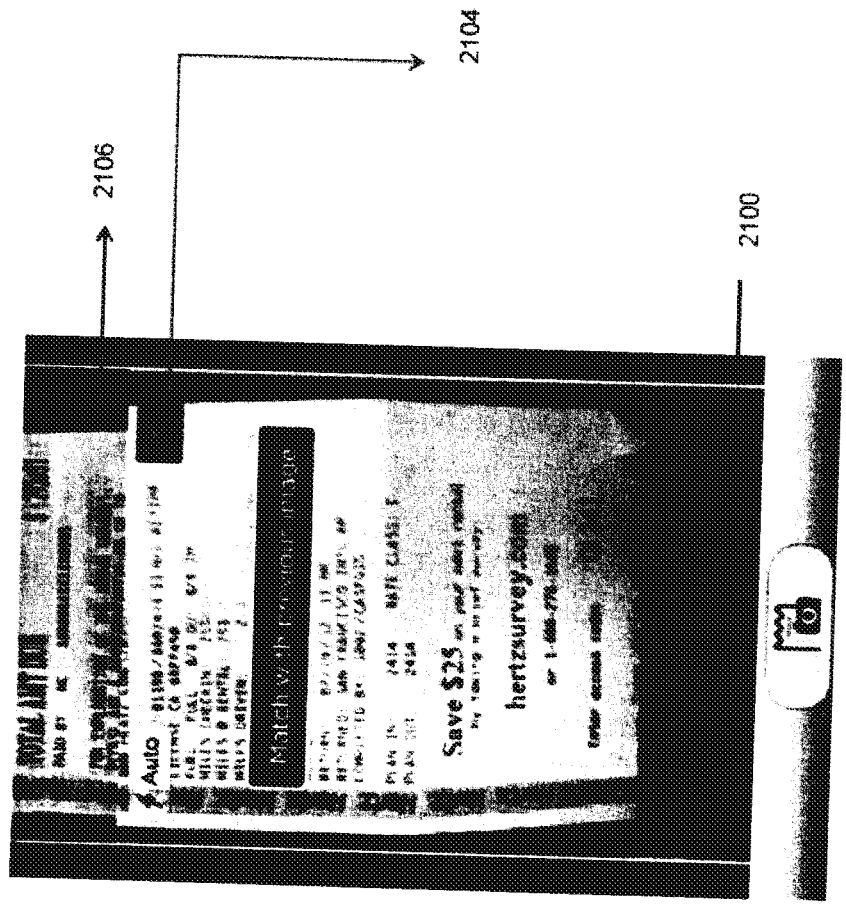
FIG. 21 illustrates a long receipt capture method in accordance with an alternative embodiment of the invention.

In an embodiment of the invention, illustrated in FIG. 21, a gyroscope icon may also be displayed to ensure that receipt capture is level so as to capture a viewable image. In particular, FIG. 21 illustrates a combination of captured images 2100. The gyroscope icon 2104 indicates the angle of the phone which aids in capture of high quality images. The preview feature 2106 illustrates a preview of the previous receipt part in order to enable better image quality when the images are stitched together. For example, if the preview and the newly viewed image are not well matched at their borders, the user can adjust the camera accordingly to adjust the currently captured image and ensure proper matching.

The gyroscope icon may provide the user with information regarding the adequacy of image capture. For example, if the camera is parallel to the receipt, the image will be captured successfully and the gyroscope icon may indicate this. The icon may change colors to show capture status. For example, if the camera and the receipt are parallel or within a few degrees tolerance, the icon may be green. If the angle between the camera and the receipt does not permit adequate image capture, the icon may be displayed as red. Intermediate color displays may also be included in order to facilitate the movement of the camera in the proper direction. Additional gyroscope icon displays are within the scope of the invention. For example, the icon may include text, such as "stop" or "go". Additionally or alternatively, the angle between the camera and the receipt may be displayed. In further embodiments, a level bubble may be displayed to indicate orientation. Generally, the user interface will provide a top line and a bottom line and if the captured image is between the two lines, the camera is likely to be parallel to the receipt to allow for successful image capture line may be utilized to show the border between the two images. In embodiments of the invention, the delineation may be accentuated by changing the transparency of one of the images. For example, by changing the transparency of the previously captured image, the system facilitates matching of the newly captured portion with the previously captured portion.

FIGS. 18A-F illustrate a method for facilitating long receipt capture with a tip overlay in accordance with an embodiment of the invention. The images illustrate combination of captured images. As will be explained below, a preview feature may be incorporated to illustrate a preview of the previous receipt part in order to enable better image quality when the images are stitched together. For example, if the preview and the newly viewed image are not well matched at their borders, the user can adjust the camera accordingly to adjust the currently captured image and ensure proper matching. Further, if any captured image is blurry or otherwise unsatisfactory, the user interfaces 18A-18F provide the opportunity to capture an addition image.

FIGS. 18A-18F also illustrate a method for facilitating long receipt capture with a tip overlay in accordance with an embodiment of the invention. FIG. 18A illustrates a tip overlay interface 1800 that instructs a user to match receipt edges. Two portions of the receipt may be illustrated, which in embodiments of the invention, may be shown as joined by a line, which may be a colored line.

FIG. 18B illustrates an interface 1810 that asks a user if a receipt is too long for capture and advises the user that two more images can be captured in order to fully capture the entire receipt. FIG. 18C provides an interface 1820 that advises a user that one more image can be captured. The displayed embodiment in which three portions of the receipt are captured is merely exemplary. The number of receipt portions may vary depending on the type of device. While a tablet may allow three photos, a smartphone may allow six or ten photos. Any number of portions and matches is within the scope of the invention.

FIG. 18D provides a user with in indication, in an interface 1830, that the entire receipt has been captured. FIG. 18E includes an interface 1840 showing multiple portions of the captured receipt and advising the user that "we'll stich it together for you." FIG. 18F illustrates an interface 1850 showing the stitched receipt and providing the user with an option to zoom in.

FIGS. 19A-19F illustrate a method for handling long receipts in accordance with an embodiment of the invention. FIG. 19A is a user interface 1900 including an informational section 1902 showing a place, date and amount of a previous purchase. A new purchase 1904 is displayed along with its date, amount, and type. A user is given an opportunity to categorize the new purchase and add a receipt for the new purchase at 1906.

FIG. 19B illustrates a user interface 1910, which is displayed after the user elects to add the receipt specified in FIG. 19A. The user is given an option 1912 to take a photograph of the receipt, to choose an image from an existing library at 1914, or to cancel the request at 1916. In FIG. 19C, and interface 1920 is produced when the user elects to choose a photo from the library. The user is given a choice of selecting a photo from existing storage locations, which include a camera roll and a photo stream in the displayed embodiment. When the user selects any of the displayed storage locations, a user interface 1930 of FIG. 19D is displayed. The interface 1930 preferably displays the contents of the storage location at 1932. The user may select any displayed photo. In the illustrated embodiment, the user selects a receipt photo 1934.

FIG. 19E illustrates a user interface 1940 displayed upon selection of the receipt. The user may categorize the receipt at 1942 and may view the categorized receipt at 1944. In FIG. 19F, an interface 1950 provides a tagging option 152 and provides an option for displaying tagged transactions, untagged transactions, and transactions over the last sixty days 1952. The transactions are shown in accordance with the selection at 1954. Selectable icons 1956 allow users to view cards, accounts, tags, and additional information.

FIGS. 20A and 20B illustrate user interfaces for adding receipts in accordance with an embodiment of the invention.

In embodiments of the invention, users may be provided with an interface 2000 that provides instructions 2002, search options 2004, and transactions 2006. The user may drill down into any transaction to view an interface 2010 shown in FIG. 20B. The interface 2010 provides instructions 2012 for viewing transaction details, the transaction details 2014 including amount, post date, type description, number, category, tags, and other descriptors if applicable. The interface 2010 may also display a receipt image 2016, options for downloading or deleting 2018, and options for saving or canceling 2020.

While the receipt capture functionality may be available through an application stored on the customer system, the functionality or portions of the functionality may also be available over a network from the data analysis and presentation system or other system. In embodiments of the invention, customers may download receipt capture applications over the network from banking systems or other centralized systems.

While embodiments of the invention are directed towards image capture with smart phones, other image capture devices may also be implemented. For example, tablets or other devices including cameras may be used. If a tablet is used, the process may be streamlined as the area for successful image capture may be increased due to the larger screen.

As set forth above, features may be provided that provide customers with assurance that purchases can be concealed from businesses, family members, or from data mining entirely. For example, a business traveler purchasing a bottle of champagne through room service may be able to suppress the product information or the entire purchase. For the benefit of the consumer, tools are provided to help with managing returns, recalls (provide notifications), manage warranties, bring out product manuals, market product accessories, etc. In the case of returns, the system optimally appends returns back to the URL in order to consolidate data.

The data analysis and presentation system obtains SKU level data that it can use for marketing and analysis of product trending. In embodiments of the invention, the data analysis creates value for merchants to better align their products. For example, the trend analysis may reveal that customers' purchases are dependent on weather conditions. Based on the temperature, humidity or forecast for rain, the system may provide the merchant with a recommendation to make a special offer on products that are expected to sell and to stock up on these products. While the system is operable with any type of bank card, embodiments of the invention are also applicable to cash transactions.

In further embodiments of the invention, customers may have multiple profiles, for example, related to multiple different bank cards. A transfer capability may be provided to move purchases from one profile to another. For example, personal purchases on a business profile could be moved to a personal profile. Also, users may tailor purchase data to include a "self destruct" provision, such that if the purchase data exits a specified domain, it will automatically be destroyed.

Data storage may be limited with respect to time in order to address space concerns. For example, data may be stored for seven years. In embodiments of the invention, this time period may be extended upon payment for a particular data plan or option.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

What is claimed is:

1. A system for facilitating purchase data capture and analysis, the system operating over a network and in conjunction with a user mobile device and a merchant computing system, the system comprising:
   at least one computer memory storing instructions;
   at least one computer processor accessing the at least one computer memory and executing the stored instructions for performing steps including;
   receiving transaction information from a merchant;
   providing an image capture application for the mobile device for processing an image capture request from a user to capture a receipt, wherein processing the request includes providing a leveling function and a matching function, the leveling function ensuring that the receipt information is fully captured based on an angle between the user mobile device and the receipt and the matching function ensuring that each edge of a captured receipt portion matches an edge of another captured receipt portion;
   matching the captured customer receipt with the transaction information from the merchant; and
   analyzing the transaction for creating at least one customer interface for the customer and at least one merchant interface for the merchant based on the analysis.

2. The system of claim 1, wherein the steps further include receiving a bank card transaction authorization stream including a URL originating from the merchant computing system, the URL received in a discretionary field in the authorization stream for a bank card purchase.

3. The system of claim 2, wherein the steps further include retrieving information at a location referenced by the URL, wherein the information includes a merchant identifier, and line item data related to a purchase and attaching the retrieved data to the transaction authorization stream to create a complete description of the transaction.

4. The system of claim 1, wherein the at least one computer processor is further programmed to provide a customer interface including product information for purchased products.

5. The system of claim 1, wherein the at least one computer processor is further programmed to provide a merchant interface identifying lapsed customers.

6. The system of claim 2, wherein the at least one computer processor is further programmed to receive data from both the merchant and the customer for storage in the location referenced by the URL.

7. The system of claim 6, wherein the data from the customer includes the captured receipt image.

8. The system of claim 1, wherein the at least one computer processor is further programmed to provide a customer user interface that provides the customer with an option to suppress purchases from appearing on the customer interface.

9. The system of claim 2, wherein the information at the location referenced by the URL includes an order number, a product code, and an item description.

10. A method for facilitating purchase data capture and analysis, the method operating over a network and in conjunction with a user mobile device and a merchant computing system, the method comprising:
   storing instructions in at least one computer memory;
   utilizing at least one computer processor accessing the at least one computer memory and executing the stored instructions for performing steps including;
   receiving transaction information from a merchant;
   providing an image capture application for the mobile device for processing an image capture request from a user to capture a receipt, wherein processing the request includes providing a leveling function and a matching function, the leveling function ensuring that the receipt information is fully captured based on an angle between the user mobile device and the receipt and the matching function ensuring that each edge of a captured receipt portion matches an edge of another captured receipt portion;
   matching the captured customer receipt with the transaction information from the merchant; and
   analyzing the transaction for creating at least one customer interface for the customer and at least one merchant interface for the merchant based on the analysis.

11. The method of claim 10, further comprising receiving a bank card transaction authorization stream including a URL originating from the merchant computing system, the URL received in a discretionary field in the authorization stream for a bank card purchase.

12. The method of claim 11, further comprising retrieving information at a location referenced by the URL, wherein the information includes a merchant identifier, and line item data related to a purchase and attaching the retrieved data to the transaction authorization stream to create a complete description of the transaction.

13. The method of claim 10, further comprising providing a customer interface including product information for purchased products.

14. The method of claim 10, further comprising providing a merchant interface identifying lapsed customers.

15. The method of claim 11, further comprising receiving data from both the merchant and the customer for storage in the location referenced by the URL.

16. The method of claim 15, wherein the data from the customer includes the captured receipt image.

17. The method of claim 10, further comprising providing a customer user interface that provides the customer with an option to suppress purchases from appearing on the customer interface.

18. The method of claim 11, wherein the information at the location referenced by the URL includes an order number, a product code, and an item description.

19. A non-transitory computer readable medium storing instructions executable by a computer processor for performing a method for facilitating purchase data capture and analysis, the method operating over a network and in conjunction with a user mobile device and a merchant computing system steps including:
   receiving transaction information from a merchant computing system;
   providing an image capture application for the mobile device for processing an image capture request from a user to capture a receipt, wherein processing the request includes providing a leveling function and a matching function, the leveling function ensuring that the receipt information is fully captured based on an angle between the user mobile device and the receipt and the matching function ensuring that each edge of a captured receipt portion matches an edge of another captured receipt portion;
   matching the captured customer receipt with the transaction information from the merchant; and
   analyzing the transaction for creating at least one customer interface for the customer and at least one merchant interface for the merchant based on the analysis.

20. The computer readable medium of claim 19, further comprising instructions for receiving a bank card transaction authorization stream including a URL originating from the merchant computing system, the URL received in a discretionary field in the authorization stream for a bank card purchase.

* * * * *